US008527616B2

(12) United States Patent
Kitani et al.

(10) Patent No.: US 8,527,616 B2
(45) Date of Patent: Sep. 3, 2013

(54) NETWORK OPERATION MANAGEMENT SYSTEM

(75) Inventors: Makoto Kitani, Yokohama (JP); Takahisa Miyamoto, Yokohama (JP)

(73) Assignee: ALAXALA Networks Corporation, Kanagawa (JP)

( * ) Notice: Subject to any disclaimer, the term of this patent is extended or adjusted under 35 U.S.C. 154(b) by 1129 days.

(21) Appl. No.: 11/451,470

(22) Filed: Jun. 13, 2006

(65) Prior Publication Data

US 2007/0118568 A1   May 24, 2007

(30) Foreign Application Priority Data

Oct. 5, 2005 (JP) ................................. 2005-291902

(51) Int. Cl.
*G06F 15/173* (2006.01)

(52) U.S. Cl.
USPC ........... 709/223; 370/315; 370/252; 370/254; 455/13.1

(58) Field of Classification Search
USPC ................. 709/223, 224, 238, 239, 240, 244; 370/252, 254
See application file for complete search history.

(56) References Cited

U.S. PATENT DOCUMENTS

| | | | | |
|---|---|---|---|---|
| 7,062,550 | B1* | 6/2006 | Hutchinson et al. | 709/224 |
| 2002/0163889 | A1* | 11/2002 | Yemini et al. | 370/238 |
| 2003/0051032 | A1* | 3/2003 | Schenkel et al. | 709/224 |
| 2003/0069960 | A1* | 4/2003 | Symons et al. | 709/224 |
| 2003/0097438 | A1* | 5/2003 | Bearden et al. | 709/224 |
| 2004/0153529 | A1* | 8/2004 | Rikitake et al. | 709/220 |
| 2005/0254429 | A1* | 11/2005 | Kato et al. | 370/238 |
| 2005/0270986 | A1* | 12/2005 | Watanabe et al. | 370/252 |
| 2006/0047800 | A1* | 3/2006 | Caveney et al. | 709/223 |
| 2006/0274725 | A1* | 12/2006 | Freitag et al. | 370/352 |
| 2007/0091838 | A1* | 4/2007 | Kobayashi et al. | 370/328 |

FOREIGN PATENT DOCUMENTS

JP     2004-193988      7/2004

OTHER PUBLICATIONS

Network Working Group: Request for Comments: 1067 "A simple Network Management Protocol" J. Case et al., pp. 1-33.
Network Working Group: Request for Comments: 854 "Telnet Protocol Specification" , J. Postel et al., pp. 1-15.
Network Working Group Request for Comments: 1945 "Hypertext Transfer Protocol" HTTP/1.0", Berbers-Lee et al., pp. 1-60.

* cited by examiner

*Primary Examiner* — Ian N Moore
*Assistant Examiner* — Jackie Zuniga
(74) *Attorney, Agent, or Firm* — Antonelli, Terry, Stout & Kraus, LLP.

(57) ABSTRACT

A network management apparatus is previously registered with a physical connection relationship and positional information of a plurality of network relay apparatuses which form part of a network, as well as a configuration definition corresponding to the positional information, such that the network management apparatus can initially detect network relay apparatuses connected to the network management apparatus, and distribute a configuration definition, which takes into account a connection relationship, to the network relay apparatuses connected thereto to set the configuration definition in the network relay apparatuses in order. In this way, even if wiring is freely made, the configuration definition which should be set in each network relay apparatus can be appropriately distributed to and set in one adjacent network relay apparatus to another. Upon occurrence of a fault, the network can be appropriately recovered by a previously set recovering scheme.

9 Claims, 24 Drawing Sheets

FIG. 3

| LOCATION (ABBREVIATION) 201 | CONFIGURATION DEFINITION 202 | CONNECTION PORT 203 | IDENTIFICATION INFORMATION 204 | APPARATUS STATE 205 | ADJACENT APPARATUS (PORT) 206 |
|---|---|---|---|---|---|
| BACKBONE SWITCH (BB) | Conf_BB | Mgr:1 | 00:00:00:00:00:01 | OK | Mgr(20),1F(1), 2F(11) |
| 1F APPARATUS (1F) | Conf_1F | BB:1-2 | 00:00:00:00:00:02 | OK | BB(1) |
| 2F APPARATUS (2F) | Conf_2F | BB:10-14 | 00:00:00:00:00:03 | OK | BB(1) |
| 3F APPARATUS (3F) | Conf_3F | BB:4-7 | 00:00:00:00:00:04 | Unknown | — |

| LOCATION ⟨211 | IDENTIFICATION INFORMATION ⟨212 | CONNECTION PORT ⟨213 | LINK STATE ⟨214 | APPARATUS STATE ⟨215 | PARENT PATH ⟨216 |
|---|---|---|---|---|---|
| Mgr | 00:00:00:00:00:0F | 20 | OK | OK | 1 |
| 1F | 00:00:00:00:00:02 | 1 | OK | OK | — |
| 2F | 00:00:00:00:00:03 | 11 | OK | — | — |
| — | — | — | — | — | — |

| LOCATION (ABBREVIATION) | CONFIGURATION DEFINITION | CONNECTION PORT | IDENTIFICATION INFORMATION | APPARATUS STATE | ADJACENT APPARATUS (PORT) |
|---|---|---|---|---|---|
| 201 | 202 | 203 | 204 | 205 | 206 |
| BACKBONE SWITCH (BB) | Conf_BB | Mgr:1 | 00:00:00:00:00:01 | OK | Mgr(20),1F(1), 2F(11) |
| 1F APPARATUS (1F) | Conf_1F | BB:1-2 | 00:00:00:00:00:02 | OK | BB(1) |
| 2F APPARATUS (2F) | Conf_2F | BB:10-14 | 00:00:00:00:00:03 | OK | BB(1) |
| 3F APPARATUS (3F) | Conf_3F | BB | 00:00:00:00:00:04 | Unknown | - |

| LOCATION (ABBREVIATION) 201 | CONFIGURATION DEFINITION 202 | CONNECTION PORT 203 | IDENTIFICATION INFORMATION 204 | APPARATUS STATE 205 | ADJACENT APPARATUS (PORT) 206 |
|---|---|---|---|---|---|
| BACKBONE SWITCH (BB) | Conf_BB | Mgr:1 | 00:00:00:00:00:01 | OK | Mgr(20),1F(1), 2F(11) |
| 1F APPARATUS (1F) | Conf_1F | BB:1-2 | 00:00:00:00:00:02 | OK | BB(1) |
| 2F APPARATUS (2F) | Conf_2F | BB:10-14 | 00:00:00:00:00:03 | OK | BB(1) |
| 3F APPARATUS (3F) | Conf_3F | BB:4-7 | – | Unknown | – |

| LOCATION (ABBREVIATION) | CONFIGURATION DEFINITION | CONNECTION PORT | IDENTIFICATION INFORMATION | APPARATUS STATE | ADJACENT APPARATUS (PORT) |
|---|---|---|---|---|---|
| BACKBONE SWITCH (BB) | Conf_BB | Mgr:1 | 00:00:00:00:00:01 | OK | Mgr(20),1F(1), 2F(11) |
| 1F APPARATUS (1F) | Conf_1F | BB:1-2 | 00:00:00:00:00:02 | OK | BB(1) |
| 2F APPARATUS (2F) | Conf_2F | BB:10-14 | 00:00:00:00:00:03 | OK | BB(1) |
| 3F APPARATUS a (3Fa) | Conf_3F | BB:4-7 | — | Unknown | — |
| 3F APPARATUS b (3Fb) | Conf_3F | BB:4-7 | — | Unknown | — |

| LOCATION (ABBREVIATION) 201 | CONFIGURATION DEFINITION 202 | CONNECTION PORT 203 | IDENTIFICATION INFORMATION 204 | APPARATUS STATE 205 | ADJACENT APPARATUS (PORT) 206 |
|---|---|---|---|---|---|
| BACKBONE SWITCH (BB) | Conf_BB | Mgr:1 | 00:00:00:00:00:01 | OK | Mgr(20),1F(1), 2F(11),3F(5) |
| 1F APPARATUS (1F) | Conf_1F | BB:1-2 | 00:00:00:00:00:02 | OK | BB(1) |
| 2F APPARATUS (2F) | Conf_2F | BB:10-14 | 00:00:00:00:00:03 | OK | BB(1),3F(19) |
| 3F APPARATUS (3F) | Conf_3F | BB:4-7 | 00:00:00:00:00:04 | OK | BB(1),2F(3) |

| LOCATION 211 | IDENTIFICATION INFORMATION 212 | CONNECTION PORT 213 | LINK STATE 214 | APPARATUS STATE 215 | PARENT PATH 216 |
|---|---|---|---|---|---|
| BB | 00:00:00:00:00:01 | 1 | OK | OK | 1 |
| 2F | 00:00:00:00:00:03 | 3 | OK | OK | 2 |
| - | - | - | - | - | - |

```
path 1F {
  tag_port <CONNECTION PORT (1F)>
}
path 2F {
  tag_port <CONNECTION PORT (2F)>
}
path 3F {
  tag_port <CONNECTION PORT (3F)>
}
path Mgr {
  untag_port <CONNECTION PORT (Mgr)>
} vlan Sales_div {
  vlan_id 10
  path 1F,3F
  ip 10.1.10.1/24
}
vlan Market_div {
  vlan_id 20
  path 2F
  ip 10.1.20.1/24
}
vlan Managed {
  vlan_id 100
  path Mgr
  ip 10.1.100.1/24
}
```

FIG. 21

```
path 1F {
  tag_port 1
}
path 2F {
  tag_port 11
}
path Mgr {
  untag_port 20
} vlan Sales_div {
  vlan_id 10
  path 1F
  ip 10.1.10.1/24
}
vlan Market_div {
  vlan_id 20
  path 2F
  ip 10.1.20.1/24
}
vlan Managed {
  vlan_id 100
  path Mgr
  ip 10.1.100.1/24
}
```

FIG. 22

```
path 1F {
  tag_port 1
}
path 2F {
  tag_port 11
}
path 3F {
  tag_port 5
}
path Mgr {
  untag_port 20
} vlan Sales_div {
  vlan_id 10
  path 1F,3F
  ip 10.1.10.1/24
}
vlan Market_div {
  vlan_id 20
  path 2F
  ip 10.1.20.1/24
}
vlan Managed {
  vlan_id 100
  path Mgr
  ip 10.1.100.1/24
}
```

FIG. 23

```
path BB {
  tag_port <CONNECTION PORT (BB)>
}
path Sales_floor {
  untag_port 10-20
} vlan Sales_div {
  vlan_id 10
  path BB,Sales_floor
}
```

FIG. 24

```
path BB {
  tag_port 1
}
path Sales_floor {
  untag_port 10-20
} vlan Sales_div {
  vlan_id 10
  path BB,Sales_floor
}
```

FIG. 25 path BB {
  tag_port <CONNECTION PORT (BB)>
}
path Market_floor {
  untag_port 10-20
} vlan Market_div {
  vlan_id 20
  path BB,Market_floor
}

FIG. 26 path BB {
  tag_port 1
}
path 3F {
  tag_port 19
}
path Market_floor {
  untag_port 10-18,20
} vlan Market_div {
  vlan_id 20
  path BB,Market_floor
}

FIG. 27 path 1F {
  tag_port 1
}
path 2F {
  tag_port 11
}
path Mgr {
  untag_port 20
} vlan Sales_div {
  vlan_id 10
  path 1F,2F
  ip 10.1.10.1/24
}
vlan Market_div {
  vlan_id 20
  path 2F
  ip 10.1.20.1/24
}
vlan Managed {
  vlan_id 100
  path Mgr
  ip 10.1.100.1/24
}

FIG. 28 path BB {
  tag_port 1
}
path 3F {
  tag_port 19
}
path Market_floor {
  untag_port 10-18,20
} vlan Market_div {
  vlan_id 20
  path BB,Market_floor
}
vlan Sales_div {
  vlan_id 10
  path BB,3F
}

FIG. 29 path 2F {
  tag_port 3
}
path Sales_floor {
  untag_port 10-20
} vlan Sales_div {
  vlan_id 10
  path 2F,Sales_floor
}

FIG. 30

| LOCATION (ABBREVIATION) 201 | CONFIGURATION DEFINITION 202 | CONNECTION PORT 203 | IDENTIFICATION INFORMATION 204 | APPARATUS STATE 205 | ADJACENT APPARATUS (PORT) 206 |
|---|---|---|---|---|---|
| BACKBONE SWITCH (BB) | Conf_BB | Mgr:1 | 00:00:00:00:00:01 | OK | Mgr(20),1F(1), 2F(11) |
| 1F APPARATUS (1F) | Conf_1F | BB:1-2 | 00:00:00:00:00:02 | OK | BB(1) |
| 2F APPARATUS (2F) | Conf_2F | BB:10-14 | 00:00:00:00:00:03 | Unknown | − |
| 3F APPARATUS (3F) | Conf_3F | BB:4-7 | 00:00:00:00:00:04 | Unknown | − |

| LOCATION (ABBREVIATION) | CONFIGURATION DEFINITION | CONNECTION PORT | IDENTIFICATION INFORMATION | APPARATUS STATE | ADJACENT APPARATUS (PORT) |
|---|---|---|---|---|---|
| BACKBONE SWITCH (BB) | Conf_BB | Mgr:1 | 00:00:00:00:00:01 | OK | Mgr(20),1F(1) UNKNOWN LOCATION 1(5) |
| 1F APPARATUS (1F) | Conf_1F | BB:1-2 | 00:00:00:00:00:02 | OK | BB(1) |
| 2F APPARATUS (2F) | Conf_2F | BB:10-14 | 00:00:00:00:00:03 | Unknown | – |
| 3F APPARATUS (3F) | Conf_3F | BB:4-7 | 00:00:00:00:00:04 | Unknown | – |
| UNKNOWN LOCATION 1 | – | BB:5 | 00:00:00:00:00:03 | Reserve | – |

FIG. 32

| LOCATION (ABBREVIATION) | CONFIGURATION DEFINITION | CONNECTION PORT | IDENTIFICATION INFORMATION | APPARATUS STATE | ADJACENT APPARATUS (PORT) |
|---|---|---|---|---|---|
| BACKBONE SWITCH (BB) | Conf_BB | Mgr:1 | 00:00:00:00:00:01 | OK | Mgr(20),1F(1), 2F(11),3F(5) |
| 1F APPARATUS (1F) | Conf_1F | BB:1-2 | 00:00:00:00:00:02 | OK | BB(1) |
| 2F APPARATUS (2F) | Conf_2F | BB:10-14 | 00:00:00:00:00:04 | OK | BB(1) |
| 3F APPARATUS (3F) | Conf_3F | BB:4-7 | 00:00:00:00:00:03 | OK | BB(1) |

201 202 203 204 205 206 200

NETWORK OPERATION MANAGEMENT SYSTEM

INCORPORATION BY REFERENCE

The present application claims priority from Japanese application JP2005-291902 filed on Oct. 5, 2005, the content of which is hereby incorporated by reference into this application.

BACKGROUND OF THE INVENTION

1. Field of the Invention

The present invention relates to technologies for managing a network relay apparatus in a network operation.

2. Description of the Related Art

In a conventional network operation, network relay apparatuses are monitored in accordance with SNMP (A Simple Network Management Protocol) defined by RFC (Request For Comments) 1067 published by IETF (The Internet Engineering Task Force) to notify a network manager of a fault such as a disconnection of a link, if any, by SNMP, prompting the network manager to deal with the fault. There are few SNMP-based setting changing means.

Also, means for setting configuration data into a network relay apparatus uses Telnet defined by RFC854 and HTTP (Hypertext Transfer Protocol) defined by RFC1945 for transfer protocols, and uses a human interface such as CLI (Command Line Interface) and GUI (Graphical User Interface) to reflect the set contents to the apparatus.

Therefore, for dealing with a fault in the conventional network operation, the network manager generally analyzes possible causes for the fault, devises appropriate means for recovering the network from the fault, logs in a network relay apparatus, which has been affected by the fault, to change settings, and recovers the network from the fault.

Also, JP-A-2004-193988 describes a system which comprises an initial server and a user server. The initial server notifies the address of the user server based on a router identifier, while the user server distributes and sets configuration data corresponding to the identifier, and notifies a contact address or the like of the user of a detected fault in response to a failure in periodical delivery of the latest configuration data or in response to the absence of a response to a monitoring packet.

SUMMARY OF THE INVENTION

The conventional network operation has involved setting configuration data using CLI and GUI, monitoring the network for faults in accordance with SNMP, or employing a system which simultaneously sets and monitor network relay apparatuses as described in JP-A-2004-193988.

However, the system described in JP-A-2004-193988 assumes that there has previously existed a network which is capable of communicating with external networks through IP packets and is provided with gateway routers, so that the system cannot be applied to a network which is not connected to external networks, or a network which is to be built from the beginning, because of the inability to communicate with an initial server. Specifically, in JP-A-2004-193988, an address must have been set for the initial server on a router-by-router basis. Also, since a router identifier must be used without fail, long time and effort is required for setting each router and server and replacing a failed router with a normal one, and routers can be installed only at limited locations. Further, since the router identifier must be taken into account at all times, spare routers cannot be provided for substitution for a plurality of routers such that a failed router is immediately replaced with a spare router.

Conventional networks, which employ the CLI and GUI for settings and the SNMP for monitoring, have been operated on the assumption that network relay apparatuses are additionally installed or removed on rare occasion. Actually, however, there are many opportunities of additionally installing network relay apparatuses in a network and changing the settings therefor because a so far operative network relay apparatus fails and must therefore be replaced with an alternative apparatus, or a network design must be modified due to an increase or a decrease in capacity. When an actual network is set in a network relay apparatus, it is difficult for an engineer or an operator to manually perform similar settings in an appropriate manner, particularly for the same type or similar types of a plurality of network relay apparatuses, and erroneous inputs and erroneous connections are difficult to find during an analysis on a fault. Also, modifications are erroneously reflected to network specifications in many cases, resulting in an increase in cost when a network relay apparatus is introduced or changed.

To solve the problems mentioned above, it is necessary to keep track of a physical connection relationship and positional information on network relay apparatuses dispersed in a network, and maintain the network in a state in which appropriate settings can be made, and the latest settings are available at all times. The physical connection relationship refers to a relationship between adjacent apparatuses, and the positional information represents a role of a location at which a network relay apparatus is installed, and refers to, for example, a 3F floor switch, a gateway router.

It is therefore an object of the present invention to provide techniques for operating and managing a plurality of network relay apparatuses in an overall network with physical connection information associated with positional information, and setting a complicated configuration definition for a network relay apparatus at the time the network relay apparatus is connected to another network relay apparatus or a network management apparatus, such that a fault or a change is detected when it occurs to reflect differences to the physical connection information and positional information, thereby appropriately setting the respective apparatus.

It is another object of the present invention to provide techniques for allowing a plurality of network relay apparatuses to communicate with adjacent apparatuses to sequentially set a configuration definition to the network relay apparatus in order from a network relay apparatus which is connected to a network management apparatus, thereby making it possible to set the configuration definition to a network relay apparatus which is not located at a gateway.

To solve the problems mentioned above, for example, in a network comprising at least one network management apparatus, and at least one network relay apparatus, wherein the network management apparatus and network relay apparatus or the network relay apparatuses are connected through a link, the network management apparatus comprises a unit for communicating with the network relay apparatus, and a topology management table for managing the relation of a physical connection relationship and positional information of the network relay apparatuses to a configuration definition which defines contents set in each of the network relay apparatuses, and the network relay apparatus comprises a unit for detecting and communicating with an adjacent one of the network management apparatuses and network relay apparatuses, and an adjacent apparatus management table for recording a number and identification information of a port connected to the adjacent network relay apparatus or a number and identification information of a port connected to the network management apparatus, the present invention provides a method which comprises steps of:

(a) the network relay apparatus operating the unit for detecting the adjacent network management apparatus or the other network relay apparatus after the start of the apparatus or after a recovery to a communication available state, communicating with the network relay apparatus corresponding to a parent as positional information managed by the adjacent network management apparatus or the network management apparatus, and with the network relay apparatus which does not correspond to a parent as positional information managed by the network management apparatus, and recording each identification information and a number of each connected port in the adjacent apparatus management table;

(b) the network management apparatus updating the physical connection relationship of the started network relay apparatus, determining where the network relay apparatus is positioned as positional information, comparing a configuration definition corresponding to the determined positional information with a configuration definition currently held by the network relay apparatus, distributing the configuration definition to the network relay apparatus when the configuration definition managed by the network management apparatus is newer, receiving the configuration definition from the network relay apparatus when the configuration definition managed by the network management apparatus is older, confirming whether or not any contradiction occurs with other physical connection relationship and positional information, updating the configuration definition managed by the network management apparatus when no contradiction occurs, and distributing a modified configuration definition to the network relay apparatus when any contradiction occurs;

(c) when the configuration definition is distributed from the network management apparatus, the network relay apparatus automatically setting the distributed configuration definition therein;

(d) when some problem arises before the distributed configuration definition is set to prevent the setting from normally completing, the network relay apparatus erasing the configuration definition of the network relay apparatus itself and the settings based on the configuration definition to bring the network relay apparatus into a factory shipment state, and executing again from the step (a); and (e) the network management apparatus determining that the network relay apparatus does not normally function when the network relay apparatus again executes from the step (a) after distributing a configuration definition corresponding to positional information, when the network relay apparatus is in the factory shipment state, releasing the positional information assigned to the network relay apparatus, and setting an adjacent apparatus not to communicate until the network relay apparatus is re-started.

In this method, the network management apparatus ensures, based on the physical connection relationship, that the network relay apparatus in the network has been at least started and can communicate with an adjacent apparatus.

Also, even if the network relay apparatus which is newly started or brought into a communication available state within the network is in the factory shipment state without any settings programmed therein, or even if the network relay apparatus holds a state before a communication is resumed, it is ensured that the latest settings are maintained in the network relay apparatus, and that the network management apparatus manages the latest configuration definition for the network relay apparatus.

Thus, when the network relay apparatus fails in the network, or when a link is disconnected for some case, the network relay apparatus or link at a fault location is replaced with the same type of apparatus or link, and the replaced apparatus or link is properly wired in a range in which an adjacent relationship between apparatuses is maintained, thus making it possible to facilitate apparatus replacement operations upon occurrence of a fault by comprising the steps of:

(g) the network management apparatus determining that the physical connection relationship of the replaced network relay apparatus or link corresponds to the previous location at which the fault has occurred, from the fact that positional information of the existing network relay apparatus has been established;

(h) assigning positional information at the fault location as it is to the network relay apparatus installed at the fault location;

(i) the network management apparatus distributing an updated configuration definition to the network relay apparatus installed at the fault location and adjacent network relay apparatuses in its surroundings; and (j) the network relay apparatuses at the fault location and in surroundings thereof, to which the configuration definition has been distributed, modifying their settings in accordance with the distributed configuration definition.

In this method, even if the network relay apparatus is disconnected from a physical connection relationship with a network relay apparatus corresponding to a parent as positional information, it is possible to create a bypass path by way of the network relay apparatus if there exists a physical connection relationship with a network relay apparatus which does not correspond to a parent as positional information, and if a communication can be made with the network management apparatus by way of the network relay apparatus which does not correspond to a parent. The bypass path is applied to a path which is affected by the disconnection, from the contents of the configuration definition corresponding to the topology management table and the positional information distributed by the network management apparatus. However, the application of the bypass path may result in a degradation in network characteristics of a path such as the bandwidth, delay time and the like, as compared with those before the occurrence of the fault, and such a degradation cannot be allowed by some services provided therethrough, so that a range is set for recovering a logical network space by previously providing recovering a unit for determining whether a bypass path is searched and applied, or the occurrence of a fault is simply notified.

Other objects, features and advantages of the invention will become apparent from the following description of the embodiments of the invention taken in conjunction with the accompanying drawings.

BRIEF DESCRIPTION OF THE DRAWINGS

FIG. 3 is a table showing exemplary contents of a topology management table used by the network management apparatus;

FIG. 5 is a table showing exemplary contents of an adjacent apparatus management table used by the network relay apparatus;

FIG. 8 shows an exemplary topology management table used by the network management apparatus when a location is determined by identification information;

FIG. 11 shows an exemplary topology management table used by the network management apparatus when it determines the location of a network relay apparatus based on a connection port;

FIG. 13 shows an exemplary topology management table used by the network management apparatus when the locations of a plurality of network relay apparatuses are determined on the basis of connection ports;

FIG. 17 shows an exemplary topology management table used by the network management apparatus when there are two parent paths for a network relay apparatus;

FIG. 18 shows an exemplary adjacent apparatus management table used by a network relay apparatus which has a plurality of parent paths;

FIG. 20 shows an example of Conf_BB registered in the topology management table;

FIG. 21 shows an exemplary configuration definition for an apparatus A when it is connected to an apparatus B, an apparatus C, and the network management apparatus;

FIG. 22 shows an exemplary configuration definition for apparatus A when it is connected to apparatus B, apparatus C, apparatus D, and network management apparatus;

FIG. 23 shows an example of Conf__3F registered in the topology management table;

FIG. 24 shows an exemplary configuration definition for apparatus D when it is connected to apparatus A;

FIG. 25 shows an example of Conf__2F registered in the topology management table;

FIG. 26 shows an exemplary configuration definition for apparatus C when it is connected to apparatus A and apparatus D;

FIG. 27 shows an exemplary configuration definition for apparatus A when a bypass path is set;

FIG. 28 shows an exemplary configuration definition for apparatus C when a bypass path is set;

FIG. 29 shows an exemplary configuration definition for apparatus D when a bypass path is set;

FIG. 30 shows an exemplary topology management table when a location is determined on the basis of a connection port and identification information;

FIG. 31 shows an exemplary topology management table when an entry is created with a reserved location; and FIG. 32 shows an exemplary topology management table when identification information of locations 2F, 3F are changed in place with each other.

DETAILED DESCRIPTION OF THE EMBODIMENTS

Preferred embodiments of the present invention will be described separately in the following paragraphs. It should be understood, however, that the present invention is not limited to the following embodiments.

Figure 1:
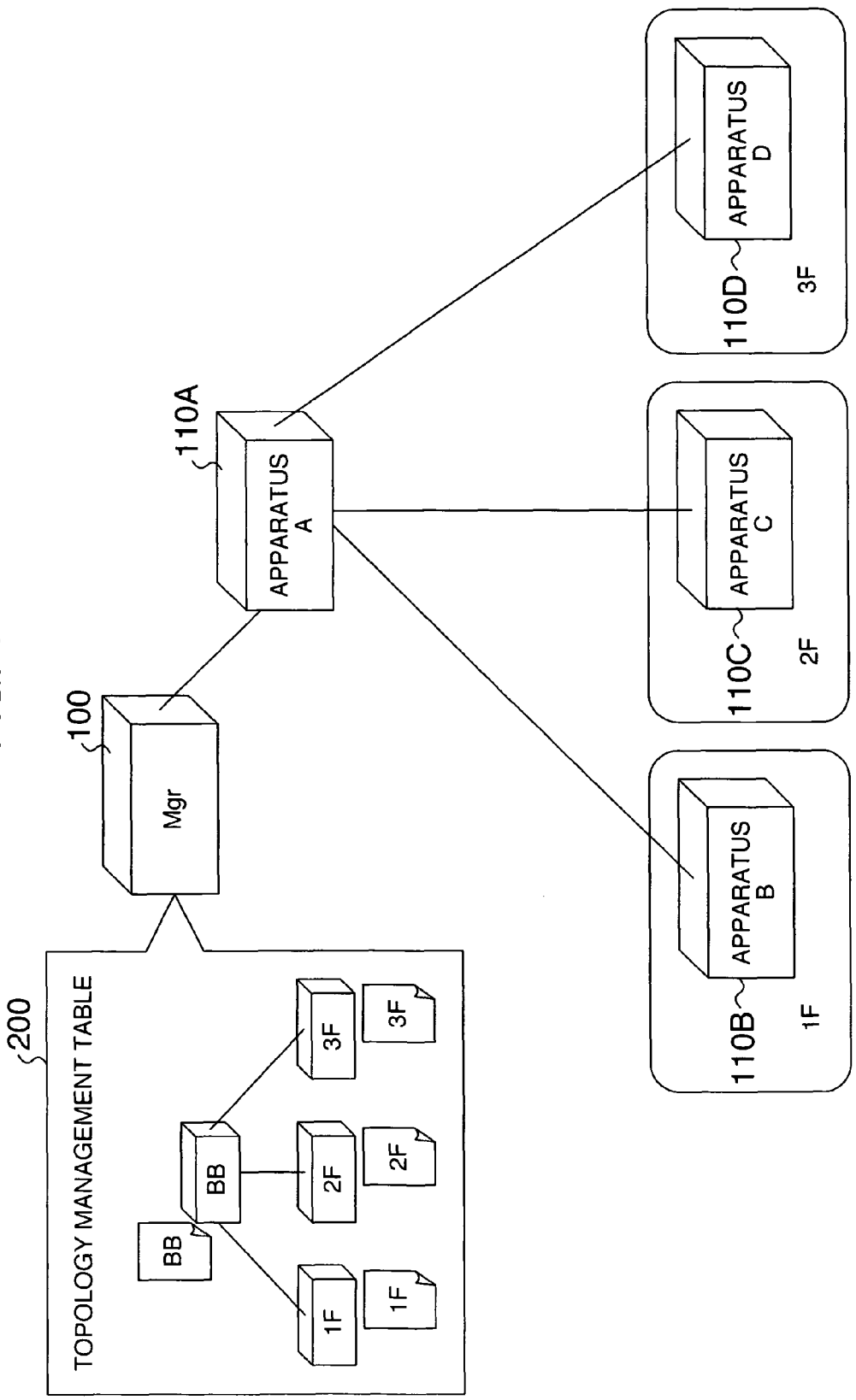
FIG. 1 is a block diagram illustrating an example of a representative network topology in a network operation management system.
Figure 2:
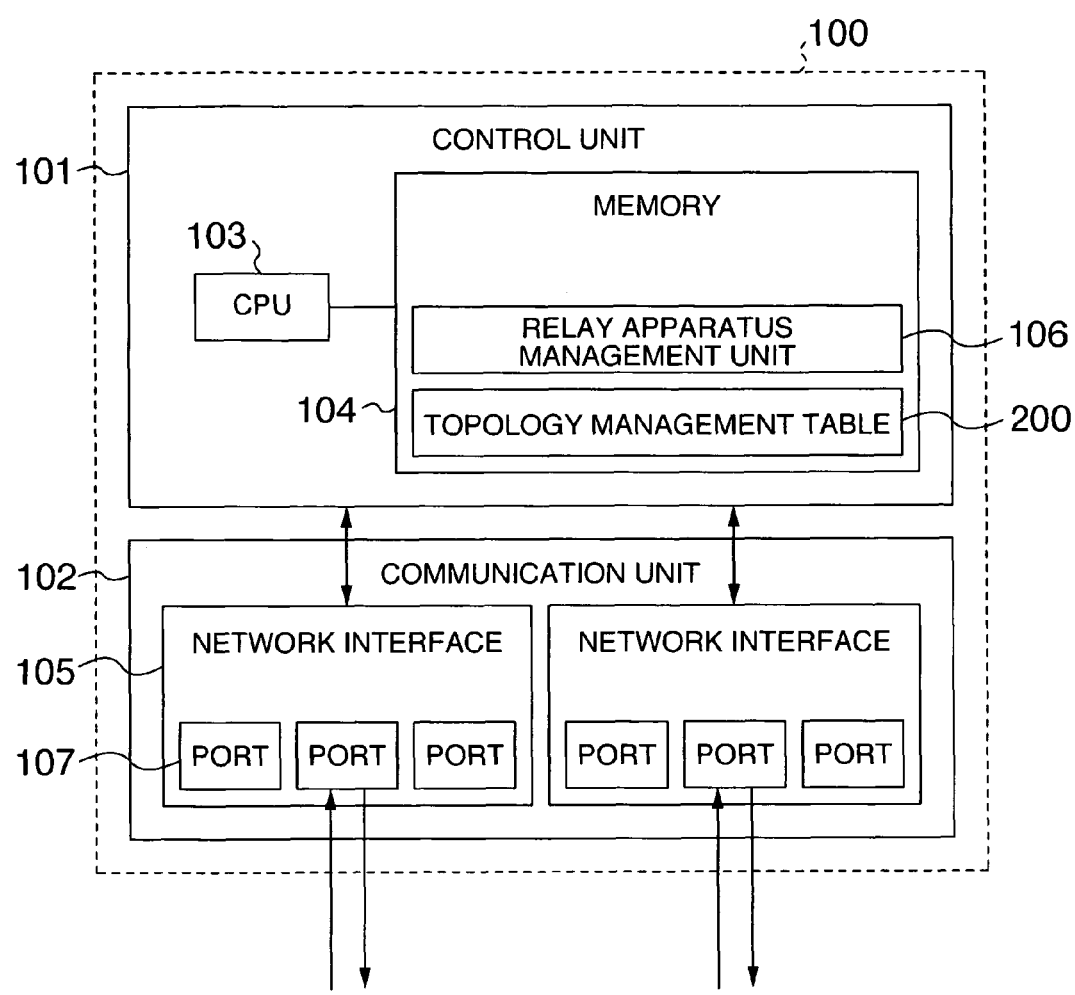
FIG. 2 is a block diagram illustrating an exemplary configuration of a network management apparatus (Mgr)

1. First Embodiment;
2. First Exemplary Modification;
3. Second Exemplary Modification;
4. Second Embodiment; and
5. Others 1. First Embodiment:

FIG. 1 illustrates the configuration of a network operation management system. The system includes a network management apparatus (hereinafter sometimes abbreviated as Mgr) 100; network relay apparatuses 110A-110D, hereinafter simply called apparatus A, apparatus B, apparatus C, and apparatus D, respectively; and an imaged topology management table 200 which is managed by the network management apparatus 100 in a tabular FIG. 2 illustrates a block diagram of the network management apparatus (Mgr) 100. The network management apparatus 100 includes a control unit 101 and a communication unit 102. The control unit 101 includes a CPU 103, a memory 104, and a table, later described, for executing sequences, later described (the control unit 101 is also called a positional information determination unit, a configuration definition information comparison unit, and a path priority management unit). The communication unit 102 comprises one or a plurality of network interfaces 105. The memory 104 records relay apparatus management unit 106 and a topology management table 200. An adjacent apparatus management function is implemented by executing a program having this function on the CPU 103. The network interface 105 comprises one or a plurality of ports 107 for containing links (also called a connection detection unit, or an identification information reception unit and port information detection unit, or configuration definition transmission unit). The adjacent apparatus management function is a function for communicating with an adjacent network relay apparatus connected to the port 107 of the network management apparatus 100 through a link to monitor the adjacent network relay apparatus for the state. This function can keep track of the state of the adjacent apparatus, and records the port 107 to which the adjacent apparatus is connected, and the state of the adjacent apparatus in the topology management table 200.

FIG. 3 shows an example of the topology management table 200 (also called a positional information management unit or a configuration definition management unit). The topology management table 200 stores settings on a location-by-location basis. The topology management table 200 stores a location 201 at which a network relay apparatus is installed; a configuration definition 202 set in the network relay apparatus at the location 201; a connection port 203 for identifying the network relay apparatus at the location 201; identification information 204 for identifying the network relay apparatus at the location 201; an apparatus state 205 indicative of the state of the network relay apparatus at the location 201; and an adjacent apparatus 206 indicative of the location and a connection port of the network management unit 100 or a network relay apparatus adjacent to the network relay apparatus at the location 201, where these items are related to one another. The connection port 203 and identification information 204 are information for identifying the location 201. A network relay apparatus is determined to be the network relay apparatus at the location 201 when it is connected to a connection port number of the network management apparatus 100 or a network relay apparatus at a location indicated by the connection port 203. Information indicated by the identification information 204 may be a serial number, a MAC address which can uniquely identify a network relay apparatus that is determined to be the network relay apparatus at the location 201. For identifying the location 201, at least one of the connection port 203 and identification information 204 should have been registered beforehand. If both the connection port 203 and identification information 204 are recorded but present different locations 201, it is assumed that there is a discrepancy due to a mix-up between apparatuses. In this event, the identification is replaced with an identification of another network relay apparatus associated with the unmatched location 201, and the determination of the location 201 is reserved until the discrepancy of the location 201 is solved. When the determination of the location is reserved, an entry is temporarily created with the apparatus status being set to Reserve for the connection port and identification information of the network relay apparatus, for which the determination of the location is reserved. The apparatus state 205 indicates OK when the associated apparatus has normally started and entered into a normal operation; NG when the apparatus fails for some reason; Unknown when no apparatus has been connected; and Reserve for a temporary entry when the determination of the location is reserved. The adjacent apparatus 206 records the network management apparatus 100 or a network relay apparatus which is connected to the network relay apparatus at the current location 201.

FIG. 30 shows the topology management table when both the connection port 203 and identification information 204 are specified. In FIG. 30, the topology management table has been previously registered with the identification information of apparatus C and apparatus D in the identification information 204 of entries for locations 2F and 3F because no apparatus has been connected on locations 2F (second floor) and 3F (third floor), but apparatus C is scheduled to be connected to the location 2F, and apparatus D to the location 3F.

FIG. 31 shows the topology management table when apparatus C is connected to a port numbered 5 of apparatus A. In this event, the location is determined to be 3F according to the connection port 203, whereas the location is determined to be 2F according to the identification information 204. In this event, for reserving the information, the network management apparatus creates an entry in which "Unknown Location 1," generated for identification by apparatus A and notified in an adjacent apparatus detection message, is set in the location 201; "BB:5" in the connection port 203; "00:00: 00:00:00:

03" in the identification information 204; and "Reserve" in the apparatus state 205, respectively.

FIG. 32 shows the topology management table after apparatus D has been connected to a port numbered 11 of apparatus A, and the locations of apparatus C and apparatus D have been determined. Apparatus D is determined to be installed at the location 2F according to the connection port 203, but at the location 3F according to the identification information 204. Here, a replacement with the identification information 204 in the reserved entry results in apparatus C installed at the location 3F and apparatus D installed at the location 2F, in the reserved entries, leading to a match of the locations of apparatus C as well as apparatus D determined according to the connection port with the locations determined according to the identification information. In this way, the values of identification information 204 of the location 2F and location 3F are changed in place, followed by determination of the locations of apparatus C and apparatus D. The entry, which has been temporarily created, is deleted.

Figure 4:
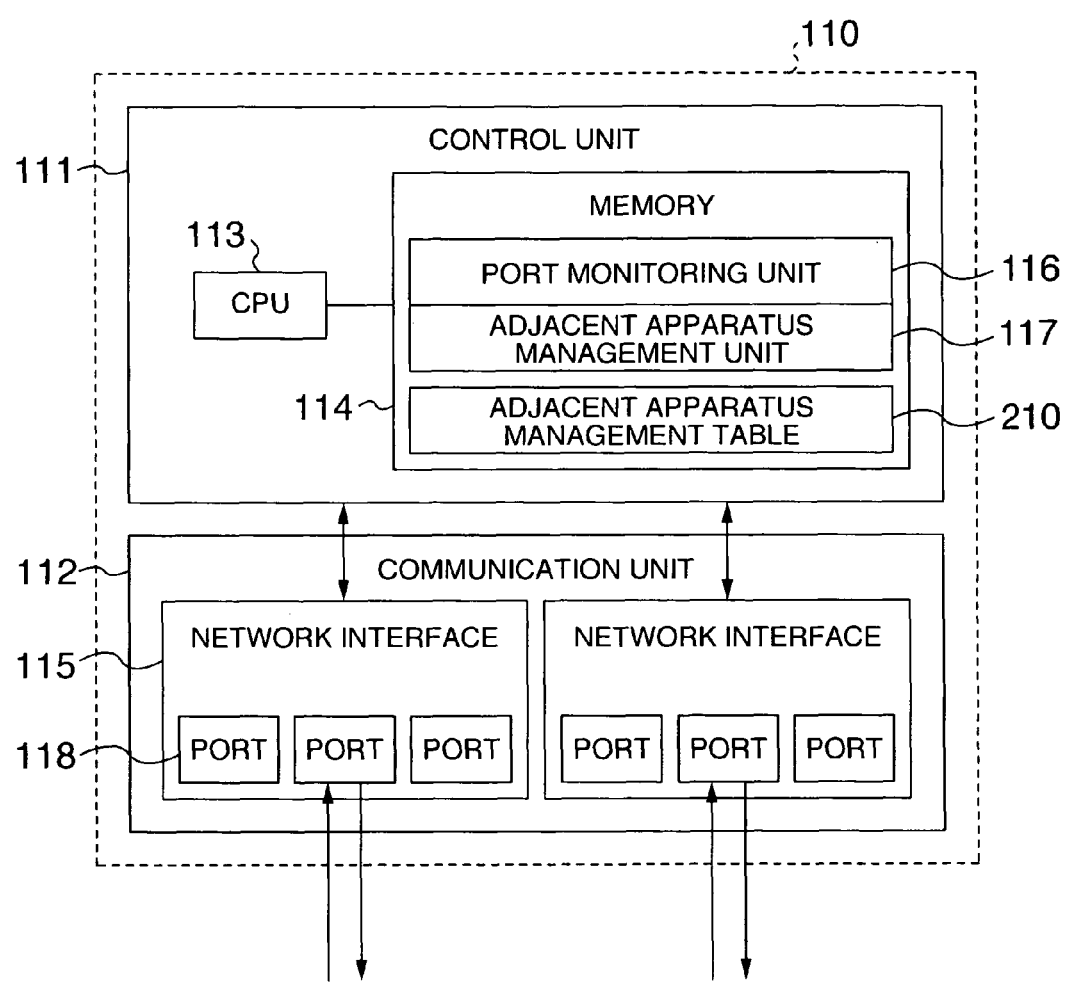
FIG. 4 is a block diagram illustrating an exemplary configuration of a network relay apparatus.

FIG. 4 illustrates a block diagram of the network relay apparatus. The network relay apparatus comprises a control unit 111 and a communication unit 112. The control unit 111 includes a CPU 113, a memory 114, and a table, later described, and executes sequences, later described (also called a management apparatus detection unit, a configuration definition setting unit). The communication unit 112 includes one or a plurality of network interfaces 115. The memory 114 includes a port monitoring unit (means) 116, an adjacent apparatus management unit (means) 117, and an adjacent apparatus management table 210. The port monitoring unit (means) 116 and adjacent apparatus management unit (means) 117 are implemented by executing software programs having a port monitoring function and an adjacent apparatus management function, respectively, on the CPU 113. The network interface 115 comprises one or a plurality of ports 118 for containing a link. The adjacent apparatus management unit 116 has functions of communicating with the network management apparatus or a network relay apparatus connected to the port 118 of the network relay apparatus through a link to monitor these apparatuses for the state. The adjacent apparatus management unit 116 can keep track of the state of the adjacent apparatus, and records the port 118 connected to the adjacent apparatus, and the state of the adjacent apparatus in the adjacent apparatus management table 210. The port monitoring unit 116 can determine whether a link is connected or disconnected by monitoring the port 118, and records the state in the adjacent apparatus management table 210.

FIG. 5 shows the adjacent apparatus management table 210. The adjacent apparatus management table 210 is made up of the following columns: a location 211 at which an adjacent apparatus is installed; identification information 212 for identifying the adjacent apparatus; a connection port 213 connected to a link associated with the adjacent apparatus; a link state 214 indicative of the state of the link with the adjacent apparatus; an apparatus state 215 indicative of the state of the adjacent apparatus; and a parent path 216 (also called a path priority) indicative of a priority within paths to the adjacent apparatus which has a path that reaches the network management apparatus. The location 211 is determined by the network management apparatus based on the identification information 212 and connection port 213 supplied from the adjacent apparatus, and recorded when the result of the determination is given from the network management apparatus. The connection port is monitored, and OK is recorded in link state 214 when a link is up, and NG is recorded when the link is down. In addition, OK is recorded in apparatus state 215 when the adjacent apparatus can normally respond, and NG is recorded when the adjacent apparatus does not respond even if a link is up or when data is collapsed. The parent path 216 is an item which is provided because this embodiment assumes that data is transferred to each adjacent network relay apparatus. The network relay apparatus transmits data, together with a header which records the identification information of the network management apparatus, to an adjacent apparatus having the highest priority for the parent path. Upon receipt of the data, the adjacent apparatus forwards the data to the adjacent apparatus having the highest priority recorded in the parent path in the adjacent apparatus management table thereof. From the network management apparatus, data is transmitted together with a header which lists identification information of adjacent apparatuses by way of which the data is sent. Upon receipt of the data, the network relay apparatus deletes its own identification information from the header, and forwards the resulting data to a next network relay apparatus, thereby enabling a communication to be made even if a network relay apparatus at a distal end cannot directly communicate with the network management apparatus since they are separated in a path table though a connection relationship is established therebetween through a link. No priority is recorded in the parent path 216 of an adjacent apparatus which does not have a path that reaches the network management apparatus.

Figure 6:
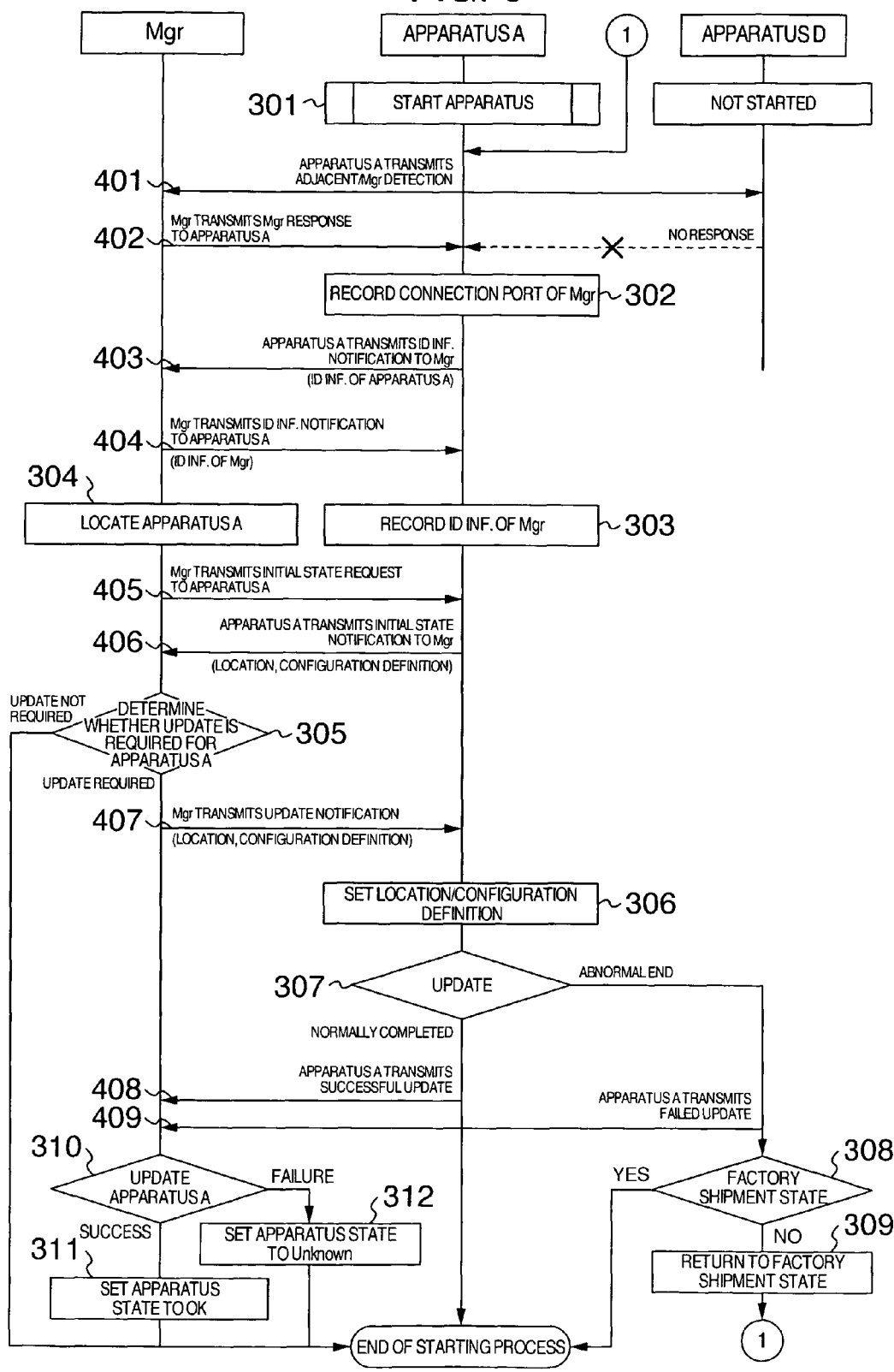
FIG. 6 is a flow diagram illustrating an exemplary processing sequence for starting the network relay apparatus when it is directly connected to the network management apparatus.

FIG. 6 illustrates a starting process from the time apparatus A is started to the time it is brought into an operative state. It is assumed in this process that apparatus D has not been started, the network management apparatus alone is in operative, and apparatus A is directly connected to the network management apparatus. In this event, apparatus A may have just been shipped from a factory without any special settings configured therein, or may be re-started for some reason after it has been set to some degree (hereinafter, S represents a step, and M represents a message).

Upon starting, apparatus A loads the adjacent apparatus management function, port monitoring function, and adjacent apparatus management table into the memory from a storage medium such as an external storage, a built-in hard disk drive associated with apparatus A, and validates the adjacent apparatus management unit, port monitoring unit (S301).

Apparatus A transmits adjacent/Mgr detection message to all ports to which links are connected in order to detect an adjacent apparatus (M401). Apparatus D does not respond because it has not been started. Upon receipt of the adjacent/Mgr detection message from apparatus A, the network management apparatus transmits an Mgr response message to apparatus A (M402).

Upon receipt of the Mgr response message, apparatus A records a port through which the message has been sent thereto in the adjacent apparatus management table as a connection port associated with the network management apparatus. If there is no entry which contains the network management apparatus in the location 211 of the adjacent apparatus management table, apparatus A creates an entry which has Mgr contained in the location 211; the number of the connection port in the connection port 213; OK in the link state 214; OK in the apparatus state 215; and "1" in the parent path 216. Even if there is an entry which contains Mgr in the location 211, this network management apparatus is not always the same as the network management apparatus on the adjacent apparatus management table, so that apparatus A creates a preliminary entry in which a character string indicative of a preliminary network management apparatus is contained in the location 211; the number of the connection port in the connection port 213; OK in the link state 214; OK in the apparatus state 215; and a number larger than one in the parent path 216 (S302).

Apparatus A transmits an identification information notification message, containing the identification information (ID INF.) of apparatus A, to the network management apparatus (M403), while the network management apparatus also transmits an identification information notification message, containing the identification information of the network management apparatus, to apparatus A (M404).

Apparatus A references the identification information 212 in an entry of the adjacent apparatus management table, which contains "Mgr" in the location 211, and records the received identification information of the network management apparatus if nothing is contained therein. If any information has been contained in the identification information 212 in the entry which contains Mgr in the location 211, apparatus A compares this information with the received identification information of the network management apparatus, and updates values in the connection port 213, link state 214, and apparatus state 215 in the entry which contains Mgr in the location 211 to values in the connection port 213, link state 214, and apparatus state 215 in the preliminary entry created for the network management apparatus, respectively, if the contained identification information 212 is the same as the received identification information, and deletes the preliminary entry for the network management apparatus. If the identification information 212 in the entry for the network management apparatus is different from the received identification information of the network management apparatus, and if NG is contained in the link state 214 or apparatus state 215 in the entry for the network management apparatus, apparatus A updates values in the identification information 212, connection port 213, link state 214, and apparatus state 215 in the entry for the network management apparatus to the received identification information of the network management apparatus, and values in the connection port 213, link state 214, and apparatus state 215 in the preliminary entry created for the network management apparatus, respectively, and deletes the preliminary entry for the network management apparatus. If the identification information 212 in the entry for the network management apparatus is different from the received identification information of the network management apparatus, but if OK is contained in the link state 214 and apparatus state 215 in the entry for the network management apparatus, this means that apparatus A has been connected to another network management apparatus, and therefore apparatus A records a character string indicative of another network management apparatus in the location 211, and the received identification information of the network management apparatus in the identification information 212 in the entry created for the preliminary network management apparatus (S303).

The network management apparatus searches the connection port 203 or identification information 204 in the topology management table for the identification information of the connection port, through which it has received the identification information notification from apparatus A, or the identification information of apparatus A to locate apparatus A from the location 201 in an appropriate entry (S304). Since the network management apparatus has received the identification information notice from port 1, a value "Mgr:1" is searched for in the connection port 203. It is "Backbone Switch (BB)" that is contained in the location 201 in an entry which has "Mgr:1" contained in the connection port 203 and an identification information of apparatus A "00:00:00:00:

00:01" contained in the identification information 204 in the topology management table 200.

After the network management apparatus has located apparatus A, the network management apparatus transmits an initial state request message to apparatus A (M405), and apparatus A transmits an initial state notification message including its location and configuration definition to the network management apparatus. If there is neither the location nor configuration definition, the initial state notification message transmitted from apparatus A to the network management apparatus does not contain any information in the location and configuration definition (M406).

The network management apparatus compares the received location and configuration definition of apparatus A with the location 201 and configuration definition 202 of an entry which has the identification information of apparatus A in the topology management table 200. If the location and configuration definition are both the latest and need not be updated, apparatus A has been available for operation, so that the network management apparatus terminates the starting process for apparatus A, and brings apparatus A into a normal operation (S305). If it is determined that apparatus A must be updated, the network management apparatus transmits to apparatus A an update notification message which contains the location 201 and configuration definition 202 of apparatus A, included in the topology management table 200 (M407).

FIG. 20 shows the configuration definition Conf_BB at the location BB, and FIG. 21 shows the configuration definition transmitted by the network management apparatus to apparatus A in the message 407. In FIG. 20, "<connection port (location)>" represents a location at which the adjacent apparatus 206 at the location BB is referenced in the topology management table 200. In FIG. 21, connection ports of paths of Mgr, 1F, 2F contain port numbers of Mgr(20), 1F(1), 2F(11), respectively, in the adjacent apparatus 206 at the location BB in the topology management table 200.

Apparatus A sets therein the location and configuration definition contained in the received update notification message to update its state (S306), and determines the result of the update (S307). If the update has been normally completed, apparatus A transmits an update success message to the network management apparatus (M408), followed by termination of the starting process. If the update abnormally ends, apparatus A transmits an update failure message to the network management apparatus (M409). If the update abnormally ends, apparatus A is returned to a state when it was shipped from the factory, so as not to bring apparatus A into the state before the update, on the assumption that the failure was caused by the state of apparatus A before it was updated, and certain settings involved in the update. For this purpose, it is determined whether or not apparatus A is in the state when it was shipped from the factory (S308), and if not, apparatus A is returned to the state when it was shipped from the factory (S309). Then, the starting process is performed again from the transmission of the adjacent/Mgr detection message (M401). If apparatus A is in the state when it was shipped from the factory, the starting process is terminated on the precondition that apparatus A is repaired or replaced with another one, assuming that the update abnormally ended not due to a problem caused by the initial state or settings but to a problem of hardware.

The network management apparatus receives the update result message from apparatus A, and sets the result of the update in the apparatus state 205 of the topology management table (S310). The network management apparatus sets the apparatus state 205 to OK in response to an update success message (S311), and sets the apparatus state 205 to Unknown in response to an update failure message (S312).

Figure 7:
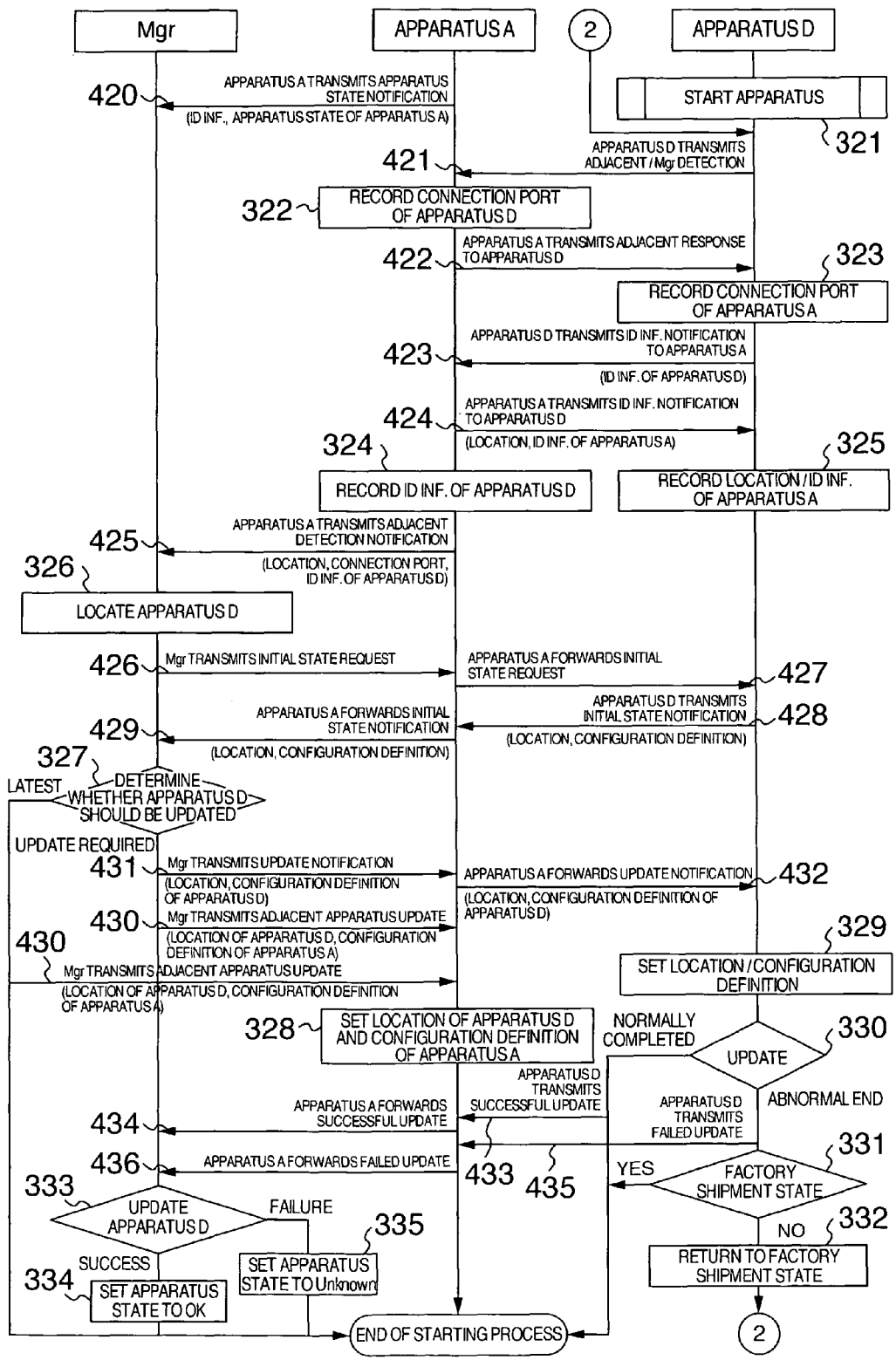
FIG. 7 is a flow diagram illustrating an exemplary processing sequence for starting the network relay apparatus when it is connected to the network management apparatus by way of an adjacent apparatus.

FIG. 7 illustrates a starting process from the time apparatus D is started to the time it is brought into an operative state. This process is performed on the assumption that apparatus A has been started, and apparatus A is positioned on a parent path, and apparatus D is indirectly connected to the network management apparatus by way of apparatus A. In this event, apparatus D may be in a factory shipped state without any special settings configured therein, or may be re-started for some reason after it has been set to some degree.

After the termination of the starting process, apparatus A periodically transmits an apparatus state notification message in order to notify adjacent network relay apparatuses and network management apparatus that apparatus A is normally operating (M420). Since apparatus A can send the apparatus state notification message, the apparatus state should have been set to OK.

Upon starting, apparatus D loads the relay apparatus management function, port monitoring function, and adjacent apparatus management table into the memory from a storage medium such as an external storage, a built-in hard disk drive associated with apparatus D, and validates the adjacent apparatus management unit and a port monitoring unit (S321).

Apparatus D transmits an adjacent/Mgr detection message to all ports to which links are connected in order to detect an adjacent apparatus (M421). Upon receipt of the adjacent/Mgr detection message from apparatus D, apparatus A records a port through which the message was sent thereto in the adjacent apparatus management table as a connection port associated with apparatus D. Apparatus A creates an entry in the adjacent apparatus management table, in which a character string indicative of an unknown location is contained in the location 211; the number of the connection port in the connection port 213; OK in the link state 214; and OK in the apparatus state 215 (S322). Simultaneously, apparatus A sends an adjacent response message to apparatus D (M422). In this event, the character string indicative of an unknown location is generated by apparatus A such that it is uniquely identified within the network.

Upon receipt of the adjacent response message from apparatus A, apparatus D records a port through which the message was sent thereto in the adjacent apparatus management table as a connection port associated with apparatus A. Then, apparatus D creates an entry in which a character string indicative of an unknown location is contained in the location 211; the number of the connection port in the connection port 213; OK in the link state 214; and OK in the apparatus state 215 (S323). In this event, the character string indicative of an unknown location is generated by apparatus D such that it is uniquely identified within the network.

Apparatus D transmits an identification information notification message which contains the identification information of apparatus D to apparatus A (M423), while apparatus A transmits an identification information notification message which contains the location and identification information of apparatus A to apparatus D (M424).

Apparatus A searches the identification information 212 in the adjacent apparatus management table for the identification information of apparatus D. If the identification information of apparatus D is not found in the adjacent apparatus management table, apparatus A records the identification information of apparatus D in the entry which contains the character string indicative of an unknown location in the location 211. If the identification information of apparatus D is found in the identification information 212 of the adjacent apparatus management table, apparatus A erases the entry which has the identification information of apparatus D, and records the identification information of apparatus D in the entry which contains the character string indicative of an unknown location in the location 211 because the value of the unknown location must be held in order to make a communication between the network management apparatus and apparatus D (S324).

Apparatus D searches the location 211 and identification information 212 in the adjacent apparatus management table for the location and identification information of apparatus A. If neither the location nor identification information of apparatus A is found in the adjacent apparatus management table, apparatus D records BB indicative of the location of apparatus A, and the identification information of apparatus A in the entry which has been created with an unknown location contained in the location 211 thereof. If the adjacent apparatus management table has an entry which contains BB in the location 211, apparatus D references the identification information 212 of BB, and records the received identification information of apparatus A if no information is contained therein. If the entry which contains BB in the location 211 has any information in identification information 212, apparatus D compares this identification information 212 with the received identification information of apparatus A, and updates the values in the connection port 213, link state 214, and apparatus state 215 in the entry which contains BB in the location 211 to the values in the connection port 213, link state 214, and apparatus state 215 in the entry which has been created with an unknown location contained in the location 211, if the identification information 212 is the same as the identification information of apparatus A, and erases the entry which contains the unknown location. If the identification information 212 in the entry which contains BB in the location 211 is different from the received identification information of apparatus A, and if NG is contained in the link state 214 or apparatus state 215 of the entry which contains BB in the location 211, apparatus D updates the values in the identification information 212, connection port 213, link state 214, and apparatus state 215 in the entry which contains BB in the location 211 to the received identification information of apparatus A, and the values in the connection port 213, link state 214, and apparatus state 215 in the entry which has been created with an unknown location contained in the location 211, respectively, and erases the entry which has an unknown location contained in the location 211. If the identification information 212 in the entry which contains BB in the location 211 is different from the received identification information of apparatus A, and if OK is contained in each of the link state 214 and apparatus state 215 in the entry which contains BB in the location 211, apparatus D records information indicative of different BB in the location 211, and the received identification information of apparatus A in the identification information 212 in the entry which has been created with an unknown location contained in the location 211, because apparatus D has connected to another network relay apparatus assigned as BB (S325).

A header indicative of an originator and a destination is added to any message which is assumed to be communicated with the network management apparatus by way of a plurality of network relay apparatuses. A message sent to the network management apparatus contains the originator which indicates the location of a network relay apparatus that transmits the message, and the destination which indicates the network management apparatus. A message from the network management apparatus to a particular network relay apparatus contains the originator which indicates the network management apparatus, and the destination which indicates the locations of network relay apparatuses in order from the nearest one from the network management apparatus. For forwarding a message to the network management apparatus, a network relay apparatus may forward the message to an adjacent apparatus on a parent path. For forwarding a message from the network management apparatus, the network relay apparatus deletes the location of the network relay apparatus itself at the head of the destinations. Then, the network relay apparatus forwards the message to an appropriate adjacent apparatus because a network relay apparatus at the head of the destinations indicates the adjacent apparatus located next to the network relay apparatus itself.

Apparatus A transmits an adjacent detection notification message which contains the location, identification information, and connection port of apparatus D to the network management apparatus (M425). The network management apparatus searches the connection port 203 or identification information 204 in the topology management table for the connection port of apparatus D or the identification information of apparatus D contained in the adjacent detection notification message from apparatus A, and locates apparatus D from the location 201 in an appropriate entry (S326). The network management apparatus determines that an identification information notification of apparatus D has been received from a port 5 of apparatus A, and searches the connection port 203 for a value "BB:5." In the topology management table 200, it is "3F apparatus (3F)" that is contained in the location 201 in an entry which contains "BB:5" in the connection port 203 and identification information of apparatus D "00:00:00:00:00:04" in the identification information 204. The location of apparatus D in the adjacent detection notification message from apparatus. A is held until the network management apparatus transmits an update notification message to apparatus D or until the network management apparatus transmits an adjacent apparatus update message to apparatus A, for use in a transmission of a message to apparatus D.

After the network management apparatus has located apparatus D, the network management apparatus transmits an initial state request message to apparatus A (M426) for transmitting the initial state request message to apparatus D (M426). Apparatus A deletes its location contained in the destination of the initial state request message before it forwards the message to apparatus D (M427). Apparatus D transmits an initial state notification message which contains the location and configuration definition of apparatus D itself to apparatus A with the network management apparatus specified for the destination. If there is neither the location nor configuration definition, the initial state notification message does not contain any information in the location and configuration definition (M428). Apparatus A forwards the initial state notification message to the network management apparatus as it is (M429).

The network management apparatus compares the received location and configuration definition of apparatus D with the location 201 and configuration definition 202 of an entry which contains the identification information of apparatus D in the topology management table 200. If the location and configuration definition are both the latest and need not be updated, apparatus D has been available for operation. Since the location 211 associated with apparatus D has been overwritten with an unknown location in the adjacent apparatus management table 210 of apparatus A, the network management apparatus transmits an adjacent apparatus update notification message which contains the location of apparatus D and the configuration definition of apparatus A, which has changed due to the addition of apparatus D, to apparatus A (M430). Apparatus A sets the location of apparatus D in the adjacent apparatus update notification message in the location 211 of the entry which has been created with an unknown location contained therein, and the changed configuration definition of apparatus A in apparatus A (S328), and terminates the overall starting process for apparatus D, and brings apparatus D into a normal operation (S327). If it is determined that apparatus D must be updated, the network management apparatus transmits to apparatus A an update notification message which contains the location 201 and configuration definition 202 of apparatus D (M431). Apparatus A deletes its location from the destination of the received update notification message, before it forwards the message to apparatus D (M432). The network management apparatus transmits to apparatus A an adjacent apparatus update notification message which contains the location of apparatus D, and the configuration definition of apparatus A which has changed due to the addition of apparatus D (M430). Apparatus A sets the location of apparatus D in the adjacent apparatus update notification message in the location 211 of the entry which has been created with an unknown location contained therein, and the changed configuration definition of apparatus A in apparatus A itself (S328).

FIG. 22 shows the configuration definition transmitted by the network management apparatus to apparatus A in the message 430, FIG. 23 shows the configuration definition Conf_3F of the location 3F, and FIG. 24 shows the configuration definition transmitted by the network management apparatus to apparatus D in the message 431. In FIG. 22, 3F is added to path 3F and path Sales_div. In FIG. 23, "<connection port (location)>" represents a location at which the adjacent apparatus 206 at the location 3F is referenced in the topology management table 200. In FIG. 24, a connection port of path BB contains the number of a port of BB(1).

Apparatus D sets therein the received configuration definition to update its state (S329), and determines the result of the update (S330). If the update has been normally completed, apparatus D transmits an update success message to apparatus A (M433), and apparatus A forwards the update success message to the network management apparatus as it is (M434), followed by termination of the starting process. If the update abnormally ends, apparatus D transmits an update failure message to apparatus A (M435). Apparatus A forwards the update failure message as it is to the network management apparatus (M436). If the update abnormally ends, apparatus D determines whether or not apparatus D is in a state when it was shipped from a factory (S331), and returns the apparatus to the state when it was shipped from the factory if it is not (S332), followed by the starting process performed again from the transmission of the adjacent/Mgr detection message (M421). If apparatus D is in the state when it was shipped from the factory, the starting process is terminated on the precondition that apparatus D is repaired or replaced with another one, assuming that the update abnormally ended not due to a problem caused by the initial state or settings but due to some problem of hardware.

The network management apparatus receives the update result message from apparatus D, and sets the result of the update in the apparatus state 205 of the topology management table (S333). The network management apparatus sets the apparatus state 205 to OK in response to an update success message (S334), and sets the apparatus state 205 to Unknown in response to an update failure message (S335).

Through the foregoing sequence of procedures, necessary information has been previously entered in the topology management table 200 of the network management apparatus.

Then, network relay apparatuses may be appropriately installed and appropriately connected to set an appropriate configuration definition.

The configuration definition set in the network relay apparatus may include definitions representative of "port," "redundant line configuration (technique for collecting a plurality of ports so that they logically appear to be a single port)," "VLAN (Virtual LAN)," "IP address," "redundant apparatus configuration (technique for providing two apparatuses with the same settings, and leaving one of the two apparatuses to wait)," "network path information," "network path exchange information," "apparatus environment information (name of apparatus, SNMP community and the like)," and so on.

2. First Exemplary Modification:

In the first embodiment, the location of a network relay apparatus is determined with reference to the connection port 203 and identification information 204 of the topology management table 200. However, links may not be necessarily wired to appropriate locations. To address this problem, the location of a network relay apparatus is determined with reference to the identification information of the network relay apparatus. In this event, only the location of an adjacent apparatus to be connected is set in the connection port 203 of the topology management table 200, and identification information of a network relay apparatus scheduled to be installed is set in the identification information 204.

FIG. 8 shows the topology management table 200 when the location of apparatus D is determined from the identification information.

Figure 9:
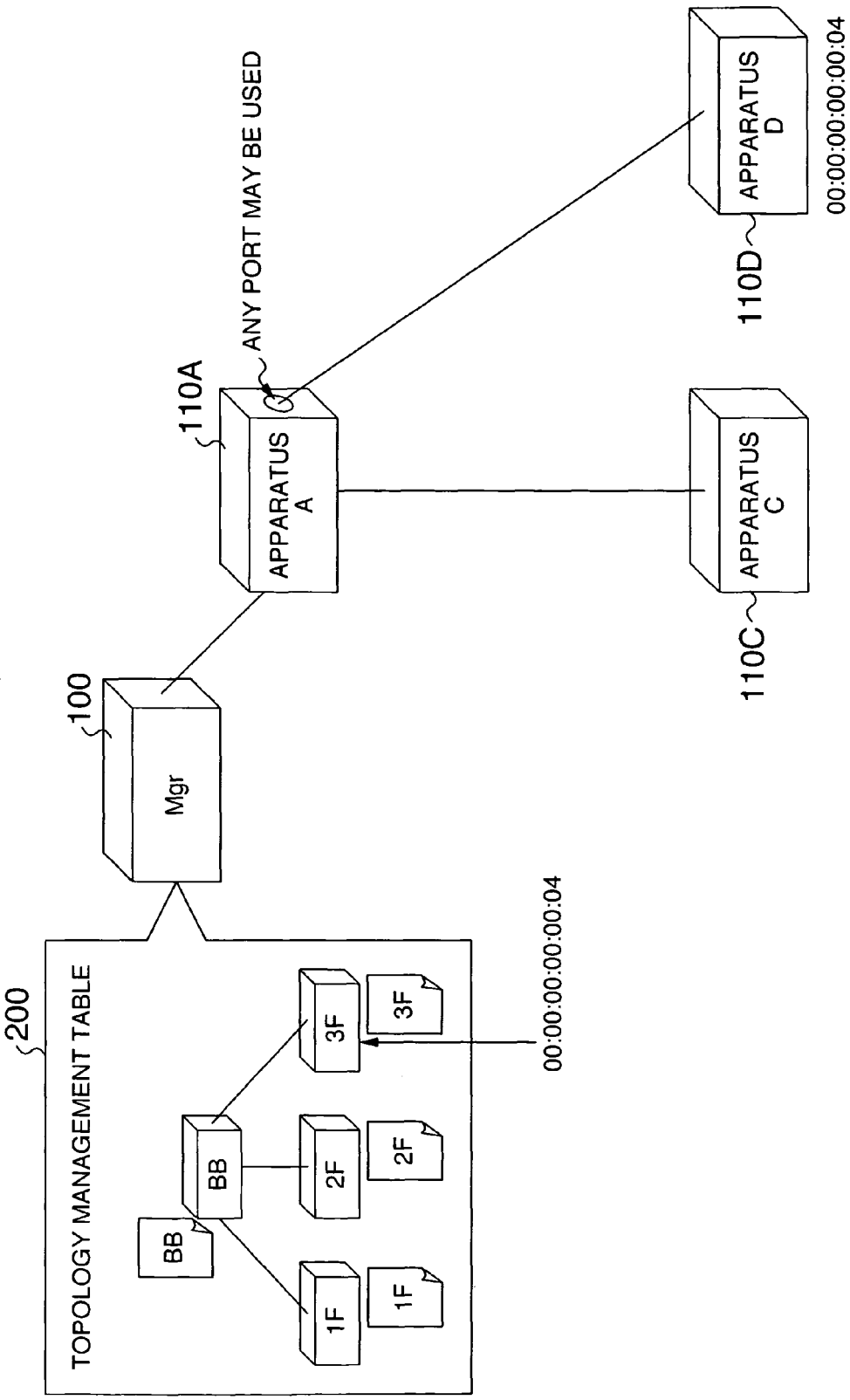
FIG. 9 is a block diagram illustrating an exemplary network topology when a network relay apparatus is connected to a connection port of the topology management table when a location is identified by identification information.
Figure 10:
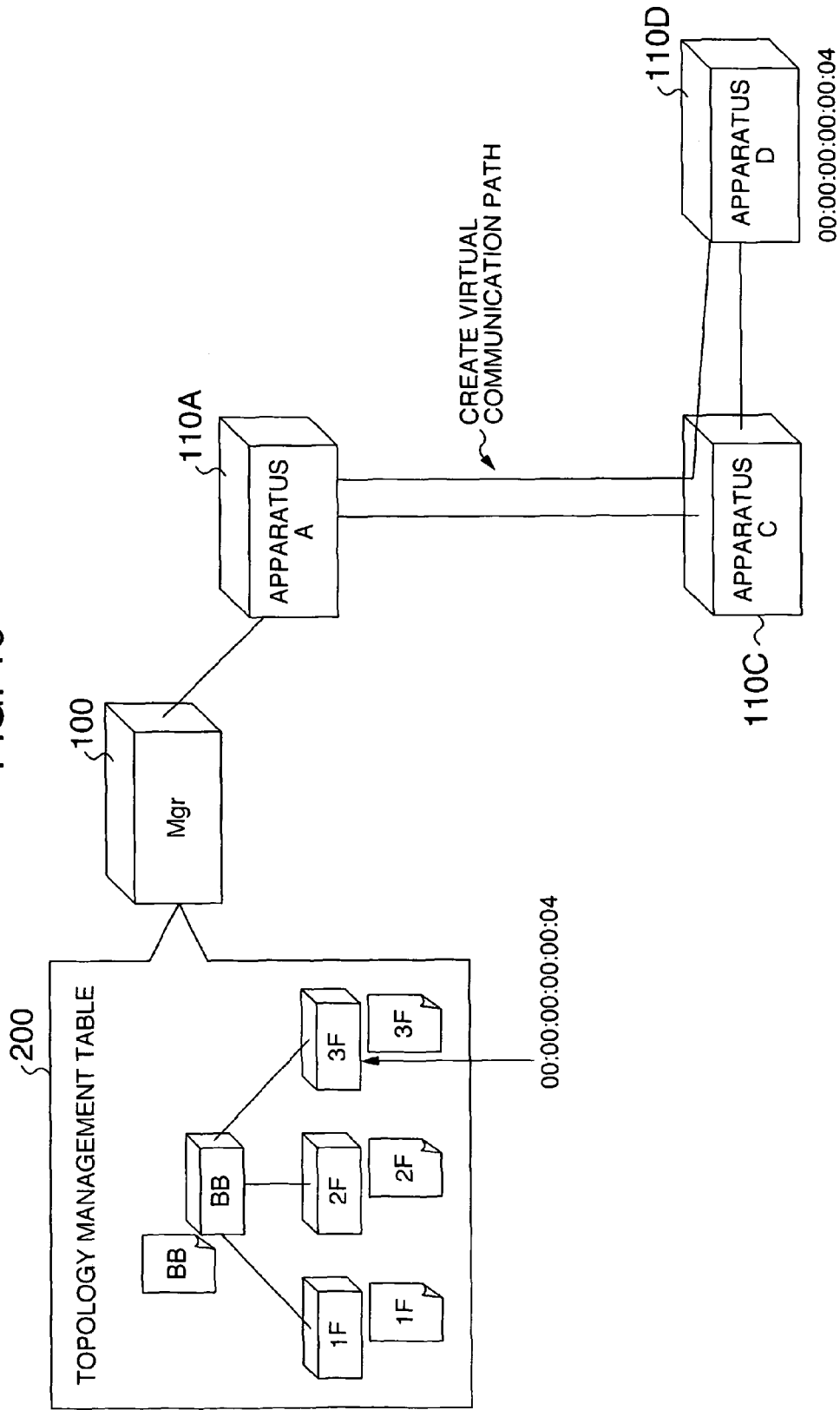
FIG. 10 is a block diagram illustrating an exemplary network topology when a network relay apparatus is connected to a port different from the connection port of the topology management table.

FIG. 9 illustrates a scenario where apparatus D is connected to apparatus A when the location of apparatus D is determined from the identification information. In this scenario, apparatus D is assigned a location 3F whichever port of apparatus A it is connected to. FIG. 10 in turn illustrates a scenario where apparatus D is connected to apparatus C when the location of apparatus D is determined from the identification information. In this scenario, though the location of the adjacent apparatus is different from the connection port 203 of the topology management table 200 held by the network management apparatus, the determination of the location based on the identification information involves creating a virtual communication path between apparatus A and apparatus D through VLAN and tunnels, modifying the contents of the configuration definitions for apparatus A, apparatus C, apparatus D so as to logically maintain the topology, and transmitting an update notification message, which contains the modified configuration definition 202, from the network management apparatus to apparatus A, apparatus C, apparatus D.

3. Second Exemplary Modification:

In the first embodiment, the location of a network relay apparatus is determined with reference to the connection port 203 and identification information 204 of the topology management table 200. However, the identification information may not be identified in some cases, for example, when a plurality of the same apparatuses are provided such that whichever apparatus may be installed without problem, when a failed apparatus is replaced with the same type of apparatus. To support this scenario, the location of a network relay apparatus is determined with reference to a connection port of the network relay apparatus. In this event, no value is set in the identification information 204 of the topology management table 200, and an adjacent apparatus to which the network relay apparatus is scheduled to be connected, and its port number are set in the connection port 203.

Figure 12:
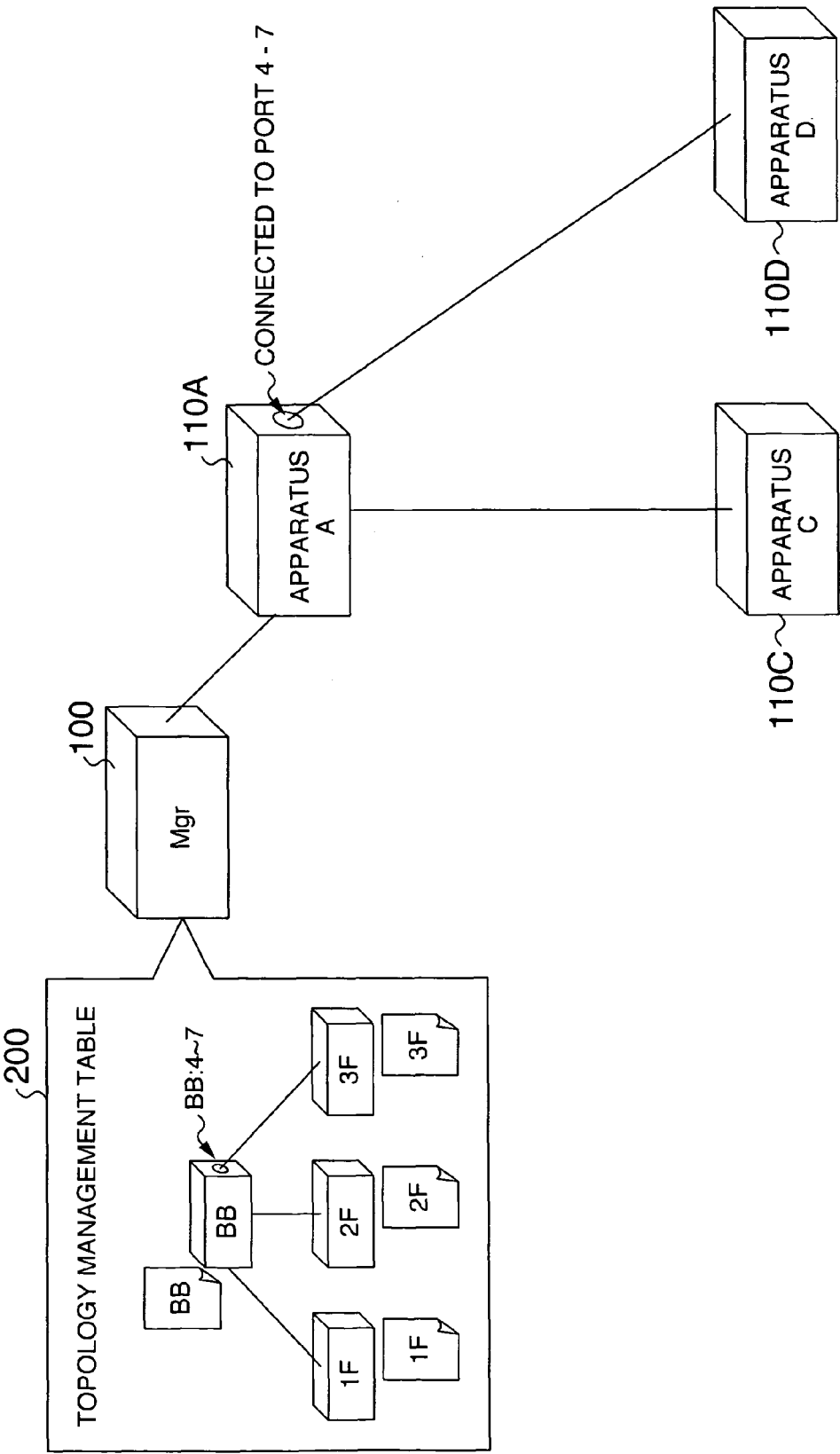
FIG. 12 is a block diagram illustrating an exemplary network topology when one network relay apparatus is connected when a location is determined on the basis of a connection port.

FIG. 11 shows the topology management table of the network management apparatus, and FIG. 12 illustrates the network topology when the location of apparatus D is determined from the connection port. In this scenario, apparatus D is assigned the location 3F when apparatus D is connected to any of ports 4-7 of apparatus A. When apparatus D is connected to a port other than ports 4-7 of apparatus A, the location 3F will not assigned to apparatus D. Likewise, if a network relay apparatus other than apparatus D is connected to any of ports 4-7 prior to apparatus D, the location 3F will not either assigned to apparatus D. After the location is assigned, identification information of the network relay apparatus, to which the location 201 has been assigned, is recorded in the identification information 204 of an entry that contains an appropriate value in the location 201 in the topology management table 200.

Figure 14:
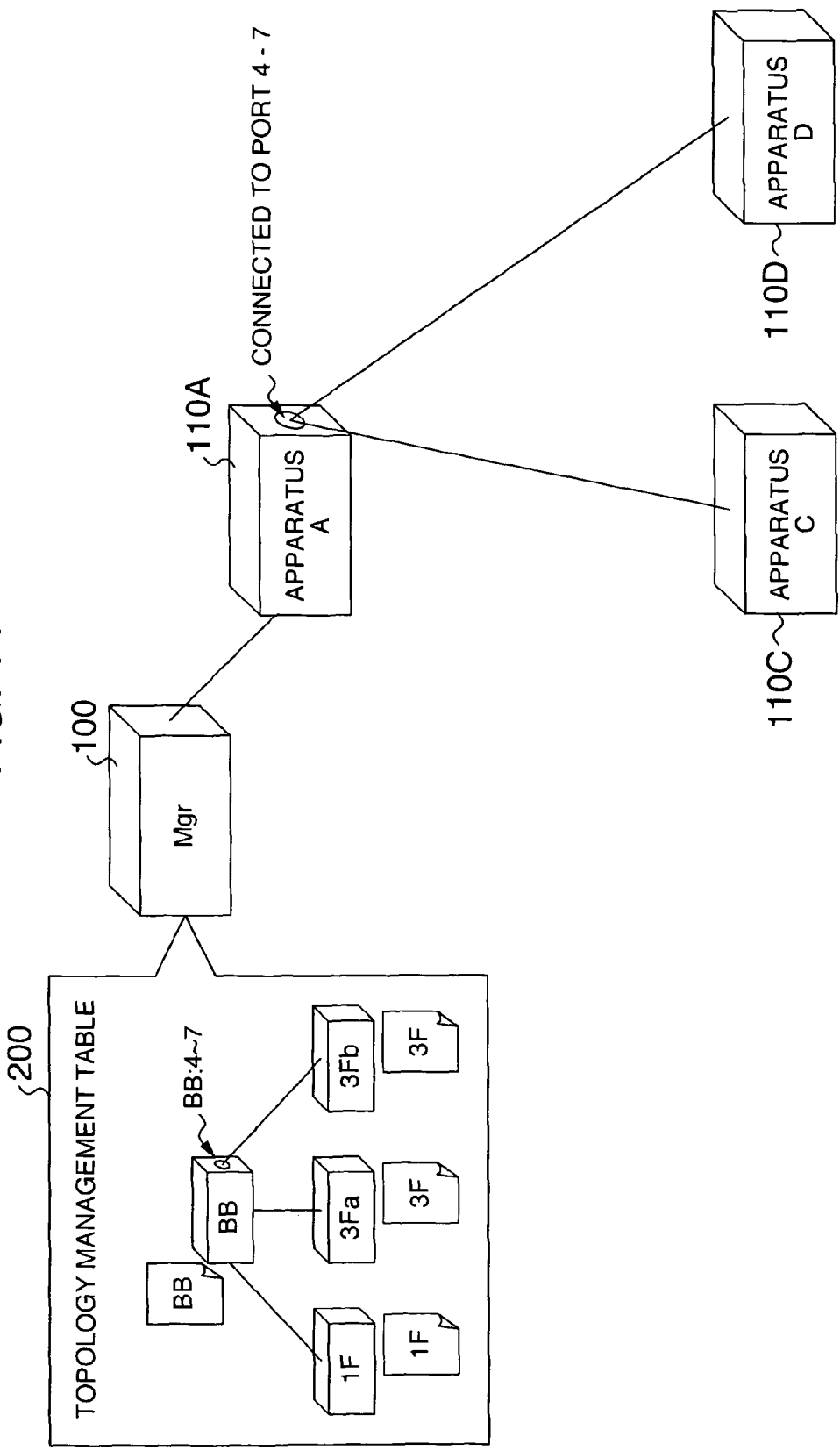
FIG. 14 is a block diagram illustrating an exemplary network topology when a plurality of network relay apparatuses are connected when a location is determined on the basis of a connection port.

FIG. 13 shows the topology management table of the network management apparatus, and FIG. 14 illustrates the network topology when a plurality of locations having the same configuration definition are determined in a range of the same connection ports. In this scenario, the topology management table 200 held by the network management apparatus is provided with a plurality of entries which have the same values in the configuration definition 202 and connection port 203. The contents of the location 201 should not match with the contents of the adjacent apparatus 206 in each entry. In this event, a location 3Fa is assigned to one of apparatus C and apparatus D, which is first connected to ports 4-7 of apparatus A. The identification information of the first connected network relay apparatus is recorded in the identification information 204 of an entry which contains 3Fa in the location 201 in the topology management table 200. A location 3Fb is assigned to a next connected network relay apparatus, and the identification information of the connected network relay apparatus is recorded in the identification information 204 of an entry which contains 3Fb in the location 201 in the topology management table 200 in a similar manner. Even if another network relay apparatus is connected to any of ports 4-7 of apparatus A, no location is assigned to this network relay apparatus.

When an apparatus is replaced with another one, it is necessary to erase the identification information 204 of an entry associated with the network relay apparatus to be replaced, in the topology management table 200, because a connection port alone does not determine the location if any value is set in the identification information 204 in the topology management table 200 of the network relay apparatus to be replaced. In this way, the network relay apparatus to be replaced is removed from the network, and another network relay apparatus of the same type is installed at the same location and wired, thereby setting the location assigned to the replaced network relay apparatus and the configuration definition of the same in the newly installed network relay apparatus. In a replacement of an apparatus, an apparatus at an unknown location is the apparatus newly installed, so that the location of an adjacent apparatus to be connected is only set in the connection port 203 of the topology management table 200. Thus, even if the apparatus is connected to whichever port, the same location is determined as the network relay apparatus before the replacement as long as required wiring is carried out with the adjacent apparatus.

For reference, U.S. application Ser. No. 11/366,587, "Data Transmission Control in Network" filed on May 3, 2006 describes techniques for modifying settings of a network relay apparatus based on the result of authenticating a terminal when the terminal is incorporated rather than the network relay apparatus. At a stage prior to the incorporation of the terminal, no special settings are required for a configuration definition of the network relay apparatus, so that the configuration definition has substantially the same contents when it is actually applied to the network relay apparatus. As such, U.S. application Ser. No. 11/366,587 may be combined with the present invention which can set the same configuration definition to a plurality of network relay apparatus to avoid such conditions under which the present invention cannot determine the configuration definition, by setting the same configuration definition. In addition, the present invention provides a configuration definition setting function for setting a configuration definition in a network relay apparatus, which is not offered by "Data Transmission Control in Network," thereby making it possible to substantially automate the incorporation from the network relay apparatus to the terminal.

Figure 15:
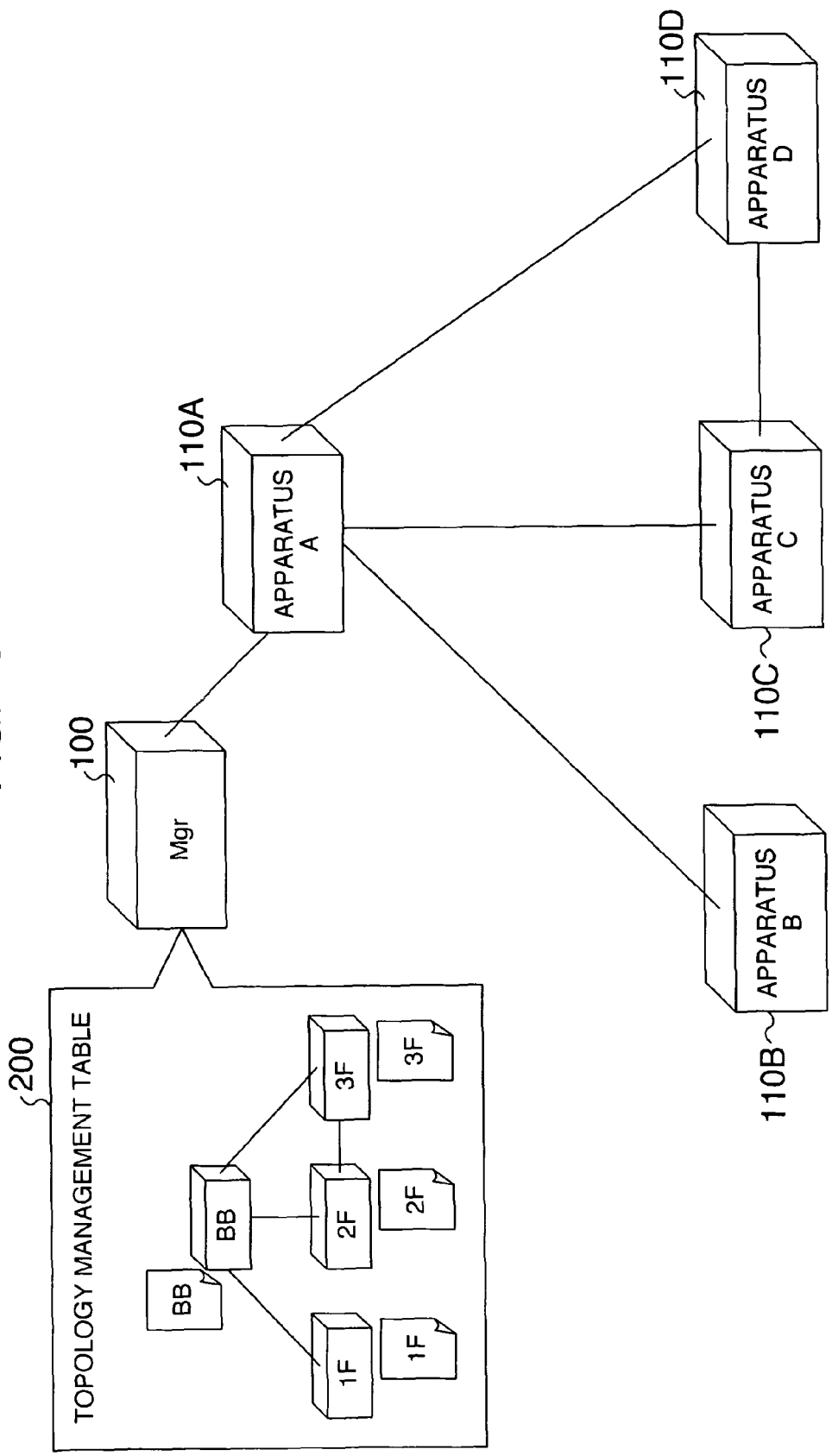
FIG. 15 is a block diagram illustrating an exemplary network topology when there are two parent paths for a network relay apparatus.
Figure 16:
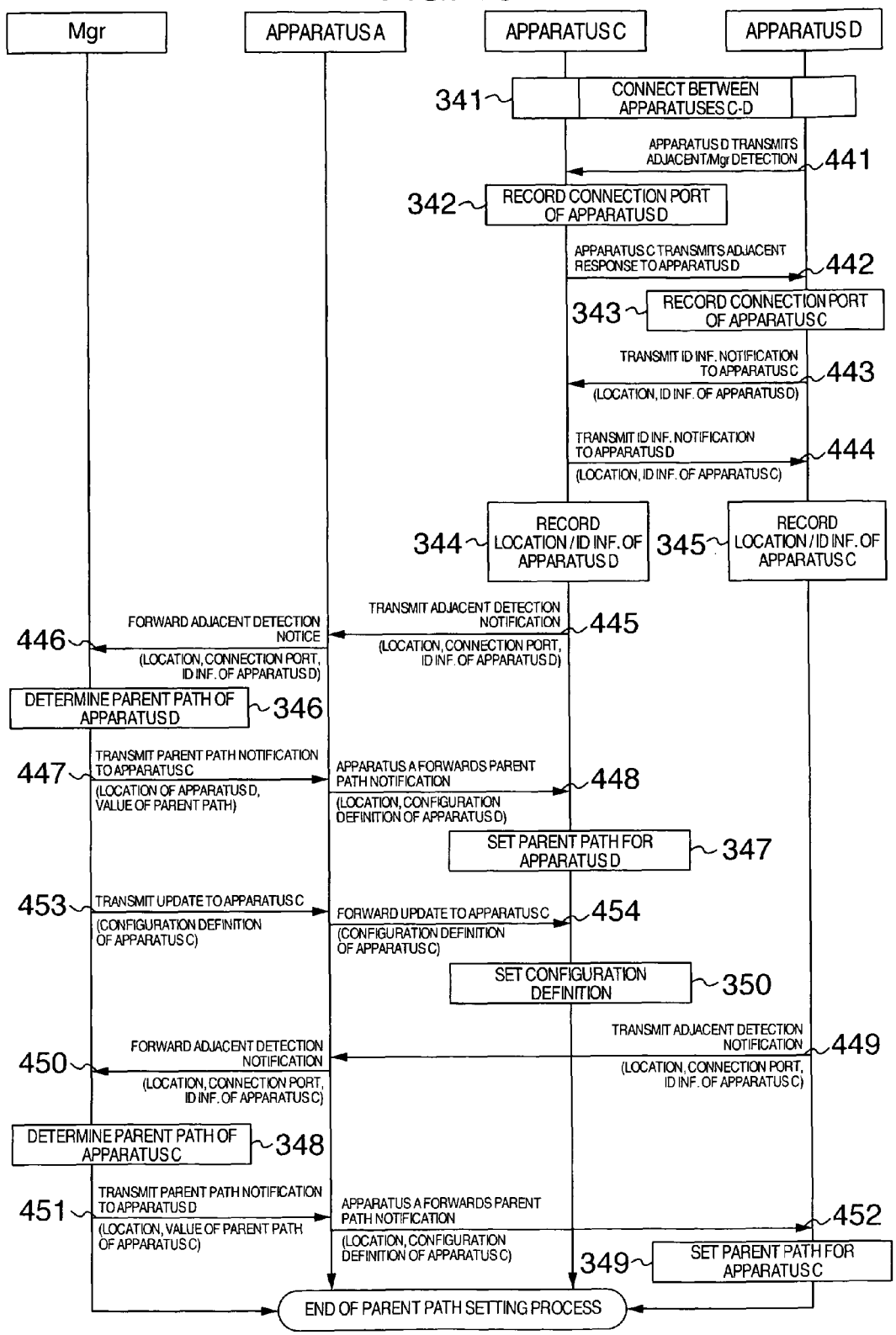
FIG. 16 is a flow diagram illustrating an exemplary processing sequence for notifying parent paths in order to register a plurality of parent paths.

4. Second Embodiment:

A second embodiment provides a redundant configuration, where links are established not only between apparatus A and apparatus D but also between apparatus C and apparatus D in the first embodiment, so that apparatus D has a plurality of parent paths. FIG. 15 illustrates a network topology when there are two parent paths in the adjacent apparatus management table of apparatus D, and FIG. 16 illustrates a sequence for recognizing a second parent path. A timing at which apparatus C is connected to apparatus D may be after apparatus D has started and has been assigned the location 3F by way of apparatus A or during the starting process of apparatus D because the network management apparatus regards a path from apparatus A as a parent path. Therefore, assume in FIG. 16 that apparatus C is connected to apparatus D after the starting process.

When a connection is made between apparatus C and apparatus D (S341), an adjacent/Mgr detection message is transmitted from apparatus C or apparatus D (M441). Upon receipt of the adjacent/Mgr detection message from apparatus D, apparatus C records a connection port to apparatus D in an adjacent apparatus management table of apparatus C (S342). Apparatus C transmits an adjacent response message to apparatus D (M442), and apparatus D, upon receipt of the adjacent response message, records a connection port to apparatus C in an adjacent apparatus management table of apparatus D (S343). Apparatus D transmits an identification information notification message which contains the location and identification information of apparatus D to apparatus C (M443). Likewise, apparatus C transmits an identification information notification message which contains the location and identification information of apparatus C to apparatus D (M444). Then, apparatus C records the location and identification information of apparatus D in the adjacent apparatus management table of apparatus C (S344), while apparatus D records the location and identification information of apparatus C in the adjacent apparatus management table of apparatus D (S345).

Apparatus C transmits an adjacent detection notification message which contains the location, identification information, and connection port of apparatus D to the network management apparatus by way of apparatus A (M445). Apparatus A forwards the adjacent detection notification message from apparatus C to the network management apparatus (M446). Upon receipt of the adjacent detection notification message from apparatus C, the network management apparatus recognizes from the location and identification information in the received message that apparatus C is at the location 3F. Then, the network management apparatus adds "3F (19)" to the adjacent apparatus 206 in an entry for apparatus C, which contains 2F in the location 201, included in the topology management table 200, determines another parent path of apparatus C because apparatus D has already been recognized by the network management apparatus (S346), and transmits a parent path notification message which contains the location and parent path of apparatus D to apparatus C (M447). Apparatus A forwards the parent path notification message from the network management apparatus to apparatus C (M448). Apparatus C sets the value "2" of the parent path within the parent path notification message received from the network management apparatus in the parent path 206 in an entry, which contains 3F in the location 201, included in the adjacent apparatus management table 210 (S347).

FIG. 25 shows the configuration definition Conf_2F at the location 2F in the topology management table. In FIG. 25, a range for Market_floor must be modified because apparatus D has been connected in a range of numbers of ports assigned to Market_floor which contains a terminal on the 2F floor. For this purpose, the network management apparatus transmits an update notification message which contains the modified configuration definition to apparatus A (M453), apparatus A forwards the update notification message to apparatus C (M454), and apparatus C sets the configuration definition received from the network management apparatus (S350). FIG. 26 shows the configuration definition transmitted by the network management apparatus to apparatus C in the message 453. In FIG. 26, "3F" is added to the path, and the range for the ports of Market_floor is changed to "10-18, 20."

Apparatus D transmits an adjacent detection notification message which contains the location, identification information, and connection port of apparatus C to the network management apparatus by way of apparatus A (M449). Apparatus A forwards the adjacent detection notification message from apparatus D to the network management apparatus (M450). Upon receipt of the adjacent detection notification message from apparatus D, the network management apparatus recognizes from the location and identification information within the message that apparatus D is at the location 2F. Then, the network management apparatus adds "2F (3)" to the adjacent apparatus 206 of an entry for apparatus D, which contains 3F in the location 201, included in the topology management table 200, determines another parent path of apparatus D because apparatus C has already been recognized by the network management apparatus (S348), and transmits a parent path notification message which contains the location and parent path of apparatus C to apparatus D (M451). Apparatus A forwards the parent path notification message from the network management apparatus to apparatus D (M452). Apparatus D sets the value "2" of the parent node within the parent path notification message received from the network management apparatus in the parent path 206 in an entry, which contains 2F in the location 211, included in the adjacent apparatus management table 210 (S349), followed by termination of a parent path setting process. FIG. 17 shows the topology management table 200 of the network management apparatus after the parent path setting process has terminated, and FIG. 18 shows the adjacent apparatus management table of apparatus D.

Figure 19:
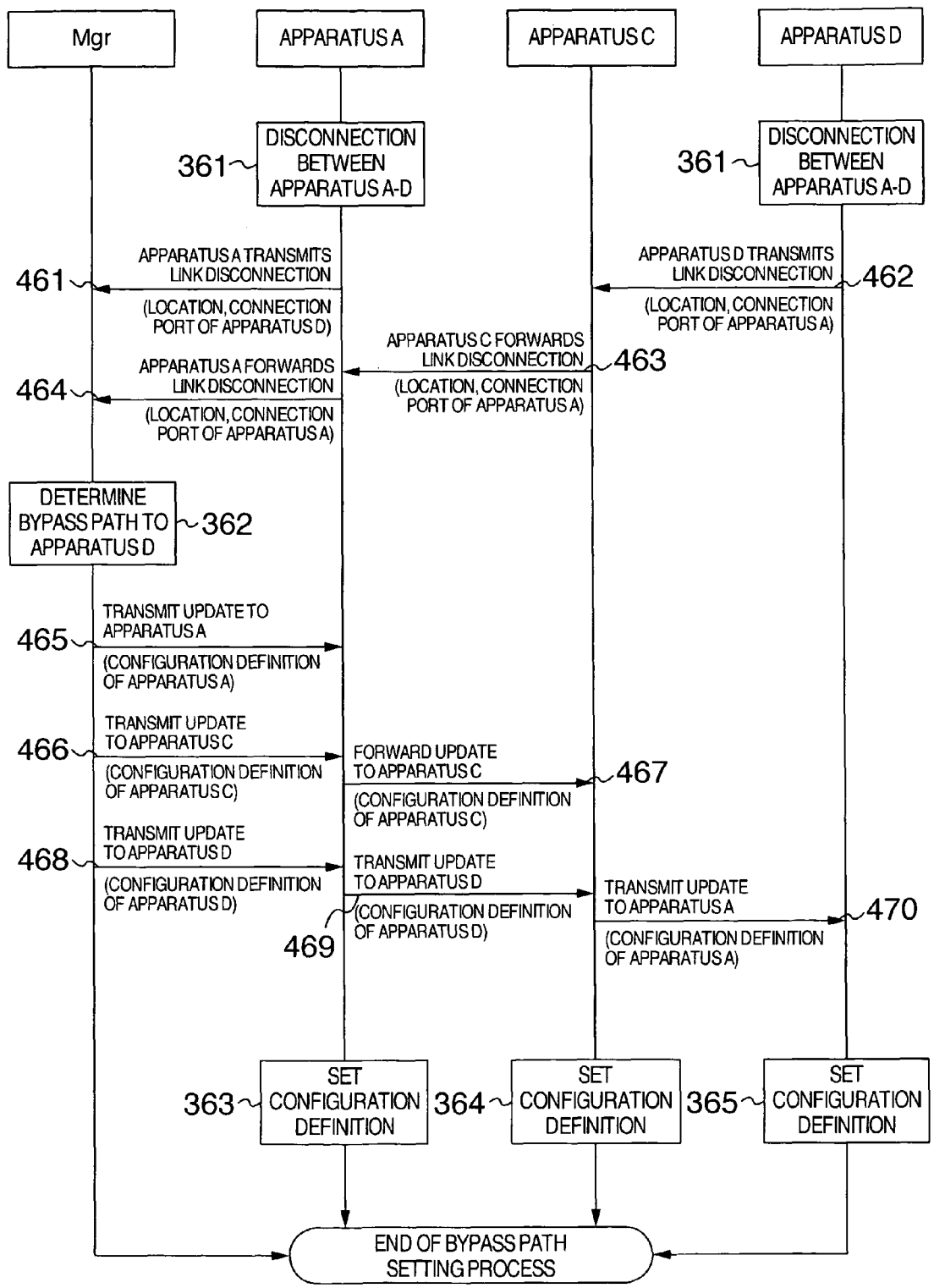
FIG. 19 is a flow diagram illustrating an exemplary processing sequence for setting a bypass path when a link included in a parent path is disconnected.

FIG. 19 illustrates a sequence for establishing a bypass path in the event of a disconnection of a link between apparatus A and apparatus D when apparatus D has a plurality of parent paths.

If a link is disconnected between apparatus A and apparatus D (S361), apparatus A transmits a link disconnection notification message to the network management apparatus (M461), apparatus D transmits a link disconnection notification message to the network management apparatus by way of apparatus C which is given the next highest priority of the parent paths (M462), apparatus C forwards the link disconnection notification message from apparatus D to apparatus A (M463), and apparatus A forwards the link disconnection notification message from apparatus D to the network management apparatus (M464). If no message is responded from an adjacent apparatus though a link is not disconnected, an adjacent apparatus fault message is sent to the network management apparatus. In the first embodiment, the current settings and state are maintained until the link is recovered because the adjacent apparatus management table does not specify any adjacent apparatus which is given the next highest priority of parent paths for apparatus D which has the disconnected link to apparatus A.

The network management apparatus changes the adjacent apparatus 206 in entries associated with apparatus A and apparatus D in the topology management table 200. Since it can be seen from the adjacent apparatus 206 of the topology management table 200 that a path to 3F in the location 201 follows BB->2F->3F, the network management apparatus creates a virtual communication path made up of VLAN and tunnel to ensure a network connectivity for 3F through a path of BB->2F->3F. Then, the network management apparatus changes the contents of the configuration definitions 202 for apparatus A, apparatus C, and apparatus D to logically maintain the topology (S362). The network management apparatus transmits update notification messages which contain the changed configuration definitions 202 to apparatus A (M465), to apparatus C (M466, M467), and to apparatus D (M468, M469, M470), respectively. Apparatus A, apparatus C, and apparatus D set the configuration definitions contained in the update notification messages from the network management apparatus (S363, S364, S365), followed by termination of the bypass pass setting process. Assuming that the network operator has previously set whether or not a bypass path should be set, the foregoing bypass path setting process is executed only when the setting of a bypass path is allowed.

FIG. 27 shows the configuration definition transmitted by the network management apparatus to apparatus A in the message 465, FIG. 28 shows the configuration definition transmitted by the network management apparatus to apparatus C in the message 466, and FIG. 29 shows the configuration definition transmitted by the manager to apparatus D in the message 468. In FIG. 27, path of 3F is deleted, and 2F is added to path of Sales_div. In FIG. 28, vlan, labeled Sales_div, is newly added. In FIG. 29, path of BB is deleted, and 2F is added to path of Sales_div.

5. Others

The followings may also be contemplated for embodiments of the present invention.

(1) In a system for use with a network which includes one or a plurality of network management apparatuses each having a unit for communicating with a network relay apparatus, a topology management table for managing a relation of a physical connection relationship and positional information of the network relay apparatus to a configuration definition which defines contents set in each network relay apparatus for realizing a logical network space, and a relay apparatus management function having a unit for communicating with the network relay apparatus, and one or a plurality of network relay apparatuses each having an adjacent apparatus management table for recording a number and identification information of a port which is connected to an adjacent network relay apparatus, or a number and identification information of a port which is connected to the network management apparatus, an adjacent apparatus management function having a unit for detecting an adjacent network management apparatus or network relay apparatus, a unit for communicating with the adjacent network management apparatus or network relay apparatus, and a unit for periodically transmitting a state of the apparatus itself, and a port monitoring function for monitoring the port to determine whether or not a link is normal or disconnected between the network relay apparatus and an adjacent network management apparatus or network relay apparatus, the network relay apparatus is connected to the network management apparatus, such that the network management apparatus determines the configuration definition for the network relay apparatus connected thereto, and sets the configuration definition in the connected network relay apparatus.

(2) In the system, another network relay apparatus is additionally connected to the network relay apparatus for which the network management apparatus has already set the configuration definition, such that the network management apparatus determines a configuration definition for the additionally connected network relay apparatus and sets the configuration definition in the additionally connected network relay apparatus by way of the network relay apparatus for which the network management apparatus has set the configuration definition.

(3) In the system, when the network management apparatus determines the configuration definition for the network relay apparatus, the network management apparatus relies on a number of a port of the adjacent network management apparatus or network relay apparatus, to which the network relay apparatus is connected, to determine the configuration definition.

(4) In the system, the same configuration definition is determined for a plurality of network relay apparatuses by specifying a plurality of numbers of ports or a range of numbers of ports of the adjacent network management apparatus or network relay apparatus.

(5) In the system, the network management apparatus determines the configuration definition for the network relay apparatus by determining the configuration definition from the identification information of the network relay apparatus.

(6) In the system, the network management apparatus determines the configuration definition for the network relay apparatus by referencing both of a number of a port of the adjacent network management apparatus or network relay apparatus, to which the network relay apparatus is connected, and the identification information of the network relay apparatus, wherein when a configuration definition determined from the number of the connection port matches a configuration definition determined from the identification information, the network management apparatus employs the matched configuration definition, whereas when they differ, the network management apparatus reserves the determination of the configuration definition. If the configuration definition determined from the number of the connection port matches the configuration definition determined from the identification information by replacing with identification information for another network relay apparatus for which the network management apparatus has reserved the determination of the configuration definition under similar conditions, the network management apparatus determines the reserved configuration definition for the network relay apparatus by replacing the conditions of the identification information.

(7) Further, in the system, the adjacent network relay apparatus detects anomalies in a failed network relay apparatus using the adjacent apparatus management function, and notifies the network management apparatus of the anomalies of the failed network relay apparatus, and the network management apparatus sets a bypass path for the adjacent network relay apparatus, thereby maintaining a logical network space though physical connections are modified.

(8) Further, in the system, when a failed network relay apparatus is replaced with a new network relay apparatus, the configuration identification set in the failed network relay apparatus is set in the new network relay apparatus by freely making wiring, without paying attention to identification information of the new network relay apparatus, or to a number of a port for connecting a link wired from an adjacent network relay apparatus or network management apparatus.

(9) Further, in the system, a network relay apparatus having a disconnected link detects the disconnection on the link between network relay apparatuses using the port monitoring function, the network relay apparatus having the disconnected link notifies the network management apparatus of the disconnected link, and the network management apparatus sets a bypass path to a network relay apparatus adjacent to the network relay apparatus having the disconnected link, thereby maintaining a logical network space though physical connections are modified.

(10) Further, in the system, when a network relay apparatus or a link is replaced to physically return the network to a normal state, a network relay apparatus adjacent to a failed network relay apparatus notifies the network management apparatus of a detected network relay apparatus, and the network management apparatus sets a release of a bypass path in the failed network relay apparatus and adjacent network relay apparatus, thereby restoring the physical connections to their original state to maintain the logical network space.

(11) Further, in the system, existing VLAN (Virtual Local Area Network) or newly established VLAN is used, or a tunneling technique is used for a bypass path to maintain the logical network space without depending on the physical connections.

As described above, according to the embodiments of the present invention, the network management apparatus has been previously registered, for example, with a physical connection relationship and positional information of one or a plurality of network relay apparatus, which make part of a network, and configuration definition corresponding to the positional information. Consequently, the physical connection relationship is solved between adjacent network relay apparatuses, IP addresses are set to appropriate values among adjacent network relay apparatuses even by free wiring without appropriately setting the IP addresses to particular ports on two apparatuses or wiring to determined ports as before, and the network is appropriately recovered by a previously set recovering scheme upon occurrence of a fault. For replacing a failed apparatus, a network relay apparatus of the same type may be substituted for the failed apparatus without paying attention to the identification information of the network relay apparatus or to a port to which it is connected, so that the substitution of the apparatus can be completed only by freely making wiring, thereby significantly reducing manual operations.

The present invention has the advantage of facilitating settings and installation of network relay apparatuses.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A network management apparatus for managing a plurality of network relay apparatuses which relay data in a data communication network, comprising:

a positional information management unit for storing positional information associated with port information of said network relay apparatuses in advance of operating the network relay apparatuses;

a connection detection unit for receiving, from a second network relay apparatus which is managed by the network management apparatus, first port information indicating a first port of the second network relay apparatus, when a first network relay apparatus which is not currently managed by the network management apparatus connects to the first port of the second network relay apparatus to join the data communication network, the first port information not including positional information of the first network relay apparatus;

a positional information determination unit for checking whether the first port information detected by said connection detection unit matches with the port information stored in the positional information management unit and, if they match with each other, determining that the first network relay apparatus is located at a place indicated by first positional information associated with the first port information; and a configuration definition information transmission unit for transmitting configuration definition information based on the first positional information determined by said positional information determination unit to said first network relay apparatus via said second network relay apparatus;

wherein:

said configuration definition information transmission unit sends the configuration definition information to said first network relay apparatus to effect said first network relay apparatus being managed by the network management apparatus;

said connection detection unit receives, from the first network relay apparatus which becomes to be managed by the network management apparatus, second port information indicating a second port of the first network relay apparatus, when a third network relay apparatus connects to the second port of the first network relay apparatus, the second port information not including positional information of the third network relay apparatus; and at least one of the positional information management unit, the connection detection unit, the positional information determination unit, and the configuration definition information transmission unit are effected via a programmed CPU.

2. A network management apparatus according to claim 1:

wherein the positional information management unit is more specifically a physical positional information management unit for storing physical positional information associated with port information of said network relay apparatuses in advance of operating the network relay apparatuses; and, wherein the place is more specifically a physical place.

3. A network management apparatus for managing a plurality of network relay apparatuses which relay data in a data communication network, comprising:

a positional information management unit for storing positional information associated with identification information of a plurality of network relay apparatuses in advance of operating the network relay apparatuses;

a connection detection unit for receiving, from a second network relay apparatus which is managed by the network management apparatus, first identification information of a first network relay apparatus which is not currently managed by the network management apparatus when the first network relay apparatus connects to the second network apparatus to join the data communication network, said first identification information not including positional information of the first network relay apparatus;

a positional information determination unit for determining whether the first identification information detected by the connection detection unit coincides with one of the identification information stored in the positional information management unit, and determining that the first network relay apparatus is located at a place indicated by first positional information associated with the first identification information; and a configuration definition transmission unit for acquiring the configuration definition information based on the first positional information determined by said positional information determination unit and transmitting it to said first network relay apparatus via said second network relay apparatus;

wherein:

said configuration definition information transmission unit sends the configuration definition information to said first network relay apparatus to effect said first network relay apparatus being managed by the network management apparatus;

said connection detection unit receives, from the first network relay apparatus which becomes to be managed by the network management apparatus, second identification information of the first network relay apparatus, when a third network relay apparatus connects to the first network relay apparatus, the second identification information not including positional information of the third network relay apparatus; and at least one of the positional information management unit, the connection detection unit, the positional information determination unit, and the configuration definition transmission unit are effected via a programmed CPU.

4. A network management apparatus according to claim 3, further comprising:

a configuration definition management unit for managing the positional information and the configuration definition information in correspondence to each other; and a configuration definition information comparison unit for receiving configuration definition information of said first network relay apparatus from said first network relay apparatus for comparison with the configuration definition information managed in correspondence to the first positional information by said configuration definition management unit, wherein said configuration definition transmission unit acquires the configuration definition information corresponding to the first positional information determined by said positional information determination unit from said configuration definition management unit and transmits it to said first network relay apparatus when the comparison made by said configuration definition information comparison unit results in an unmatch.

5. A network management apparatus according to claim 3, further comprising:

a path priority management unit, responsive to second identification information of a second network relay apparatus connected to said first network relay apparatus received by said connection detection unit via said first network relay apparatus, for managing second positional information determined by said positional information determination unit and a path priority indicative of a priority for a path to said network management apparatus in correspondence to each other based on the second identification information.

6. A network management apparatus according to claim 5, wherein:

said path priority management unit changes the path priority when said path priority management unit receives information on a fault from said second network relay apparatus.

7. A network management apparatus according to claim 6, wherein:

said path priority management unit instructs said plurality of network relay apparatuses to create a virtual communication path which circumvents the location of the fault.

8. A network management apparatus according to claim 3:

wherein the positional information management unit is more specifically a physical positional information management unit for storing physical positional information associated with port information of said network relay apparatuses in advance of operating the network relay apparatuses; and, wherein the place is more specifically a physical place.

9. A network management apparatus for managing a plurality of network relay apparatuses which relay data in a data communication network, comprising:

a positional information management unit for storing, in advance of operating the network relay apparatuses, association information which associates, for each port of a plurality of ports of the plurality of network relay apparatuses, both: physical location information detailing a physical location of said each port within a physical installation facility, and assigned port information identifying said each port;

a connection detection unit for receiving, from a second network relay apparatus which is currently managed by the network management apparatus, first port information indicating a subject port of the second network relay apparatus, when a first network relay apparatus which is not currently managed by the network management apparatus connects to the subject port of the second network relay apparatus to join the data communication network, the first port information not including information regarding a physical location of the first network relay apparatus within the physical installation facility;

a positional information determination unit for checking whether the first port information detected by said connection detection unit, matches with any of the assigned port information stored in the association information of the positional information management unit and, if matching, determining that the first network relay apparatus is located at a physical location of the physical installation facility, which is detailed by physical location information stored in the association information and associated with the assigned port information which matches the first port information; and a configuration definition information transmission unit for transmitting configuration definition information based on the physical location information determined by said positional information determination unit, to said first network relay apparatus via said second network relay apparatus;

wherein:

said configuration definition information transmission unit sends the configuration definition information to said first network relay apparatus to effect said first network relay apparatus being managed by the network management apparatus;

said connection detection unit receives, from the first network relay apparatus which becomes to be managed by the network management apparatus, second port information indicating a second port of the first network relay apparatus, when a third network relay apparatus connects to the second port of the first network relay apparatus, the second port information not including information regarding a physical location of the third network relay apparatus; and at least one of the positional information management unit, the connection detection unit, the positional information determination unit, and the configuration definition information transmission unit, are effected via a programmed CPU.

* * * * *